United States Patent [19]

Tsukahara et al.

[11] Patent Number: 4,827,516

[45] Date of Patent: May 2, 1989

[54] METHOD OF ANALYZING INPUT SPEECH AND SPEECH ANALYSIS APPARATUS THEREFOR

[75] Inventors: Yusuke Tsukahara, Tokyo; Hitoshi Masuda, Yamato; Mikio Yamaguchi, Saitama; Masao Tanabe, Tokyo, all of Japan

[73] Assignee: Toppan Printing Co., Ltd., Tokyo, Japan

[21] Appl. No.: 917,509

[22] Filed: Oct. 10, 1986

[30] Foreign Application Priority Data

| | | | |
|---|---|---|---|
| Oct. 16, 1985 | [JP] | Japan | 60-230367 |
| Oct. 16, 1985 | [JP] | Japan | 60-230368 |
| Oct. 17, 1985 | [JP] | Japan | 60-231721 |

[51] Int. Cl.[4] .......... G10L 5/00

[52] U.S. Cl. .......... 381/36; 381/37; 381/45; 364/513.5

[58] Field of Search .......... 381/36–41, 381/45, 48–50; 364/513.5

[56] References Cited

U.S. PATENT DOCUMENTS

| | | | |
|---|---|---|---|
| 3,649,765 | 3/1972 | Rabiner et al. | 381/39 |
| 4,087,632 | 5/1978 | Hafer | 364/513.5 |
| 4,344,031 | 8/1982 | Kuhn et al. . | |

OTHER PUBLICATIONS

"Cepstrum Pitch Determination" by A. Michael Noll, J. Acoust. Soc. Am., vol. 41, pp. 293–309, Feb. 1967.

IEEE Transaction on Audio and Electroacoustics, vol. AU–16, No. 2, Jun. 1968, pp. 256–261, N.Y., "Some Experiments with a Simple Word Recognition System" J. N. Shearme, et al.

IEEE Transactions on Acoustics, Speech and Signal Processing, vol. ASSP–29, No. 4, Aug. 1981, pp. 786–794, "The Special Envelope Stimation Vocoder", D. B. Paul.

ICASSP 83, Boston, Apr. 14th–16th 1983, vol. 1 or 3, pp. 93–96, N.Y., "Cepstal Analysis Synthesis on the Mel Frequency Scale" S. Imai.

Electronics and Communications in Japan, vol. 62–A, No. 4, 1979, pp. 10–17, "Spectral Envelope Extraction by Improved Cepstral Method" S. Imai, et al.

*Primary Examiner*—Patrick R. Salce
*Assistant Examiner*—Emanuel Todd Voeltz
*Attorney, Agent, or Firm*—Bacon & Thomas

[57] ABSTRACT

A speech analysis apparatus according to the invention, comprising a transforming section for receiving a spectrum envelope, for transforming the spectrum envelope such magnitude data thereof becomes suitable, and for generating a transformed spectrum envelope, an integrator for receiving the transformed spectrum envelope output from the transforming section, for integrating the input spectrum envelope with respect to a predetermined variable, and for outputting an integrated spectrum envelope, and a projection circuit for receiving the transformed spectrum envelope from the transform circuit and the integrated spectrum envelope from the integrator, and for projecting the spectrum envelope with respect to the integrated data. Therefore, the analysis result inherent to the phoneme can be obtained regardless of vocal tract lengths. The spectrum envelope to be projected can be integrated by the integrator, along the frequency axis or the mel axis. The analysis apparatus further includes a spectrum envelope-extractor for obtaining the spectrum envelope, by using cepstrum analysis and smoothing the resultant spectrum envelope. A spectrum envelope in the transition from a consonant to a vowel can be obtained.

30 Claims, 29 Drawing Sheets

F I G. 1
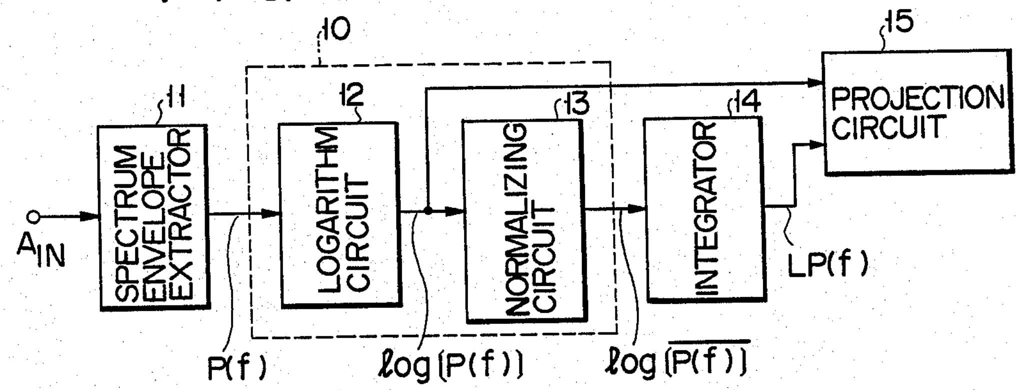
F I G. 2A
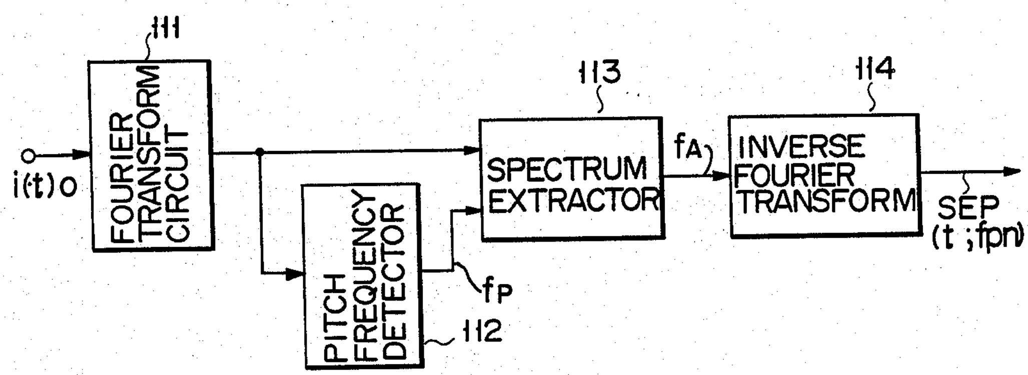
F I G. 2B
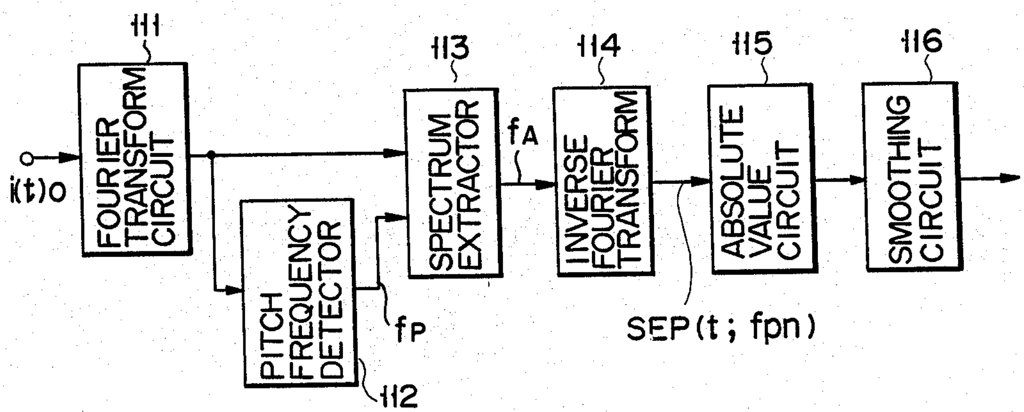

F I G. 5
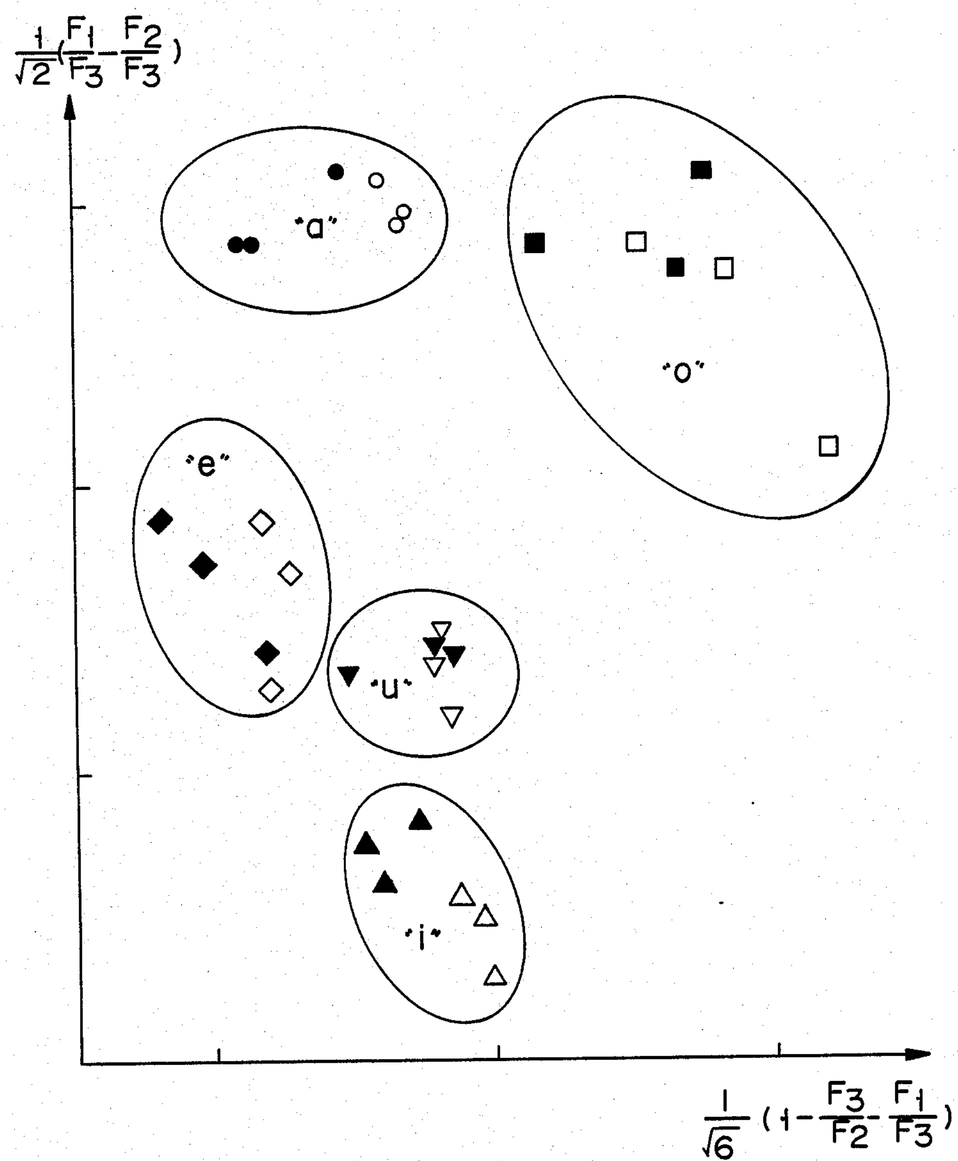

FIG. 15A
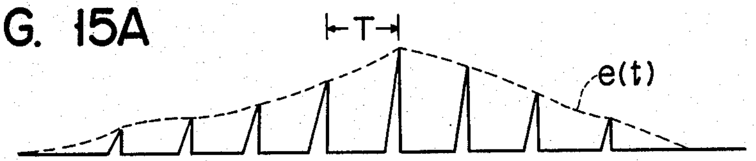
FIG. 15B
FIG. 15C
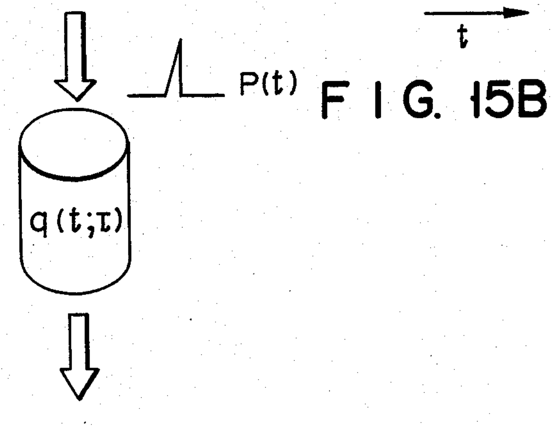
FIG. 15D
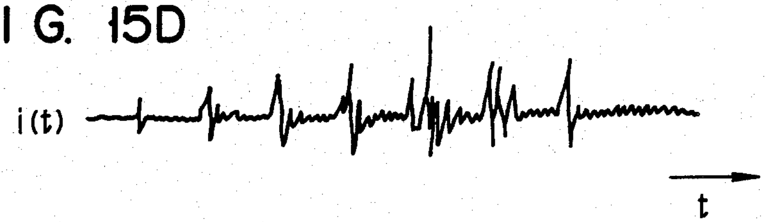

F I G. 20
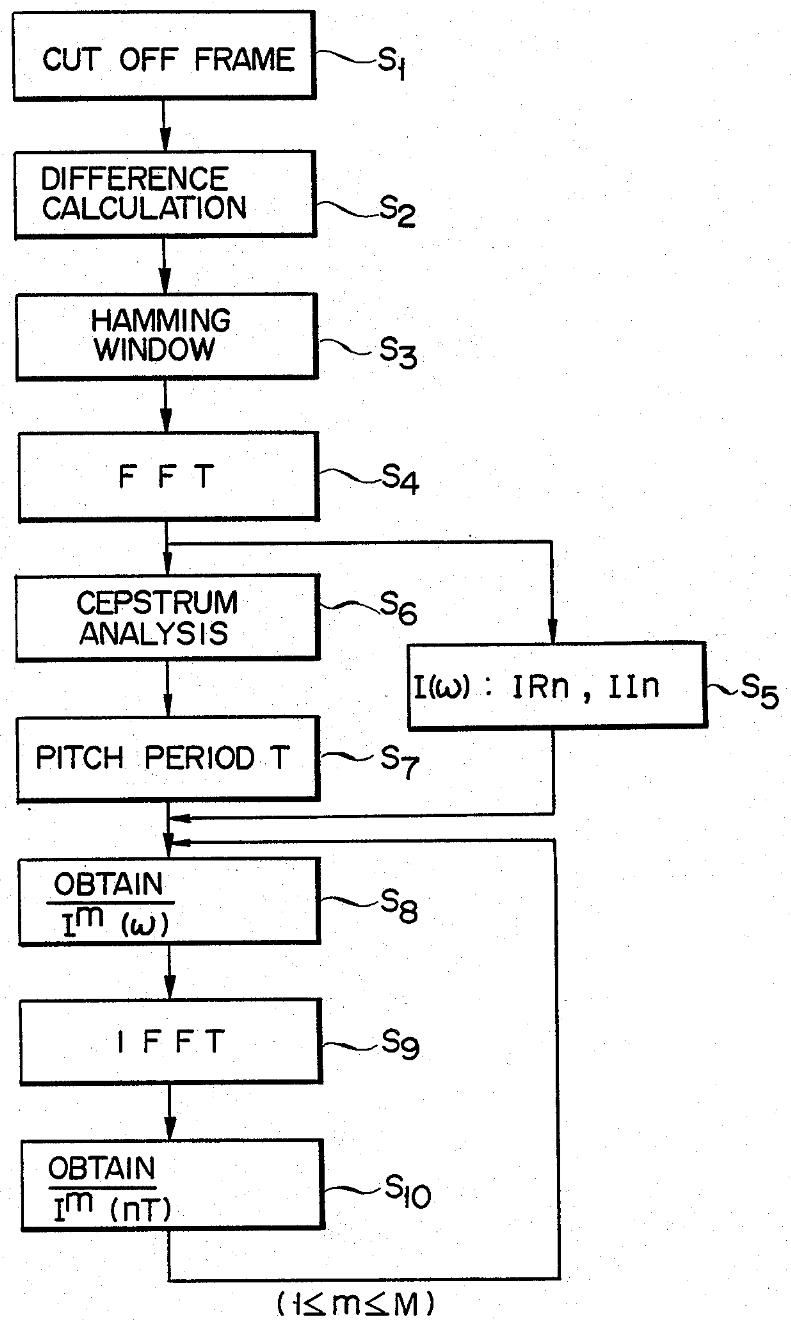

IR m·M- M/2
m·M
m·M+M/2

IMR

L

II m·M - M/2
m·M
m·M+M/2

IMI

INVERSE
POLARITY
L

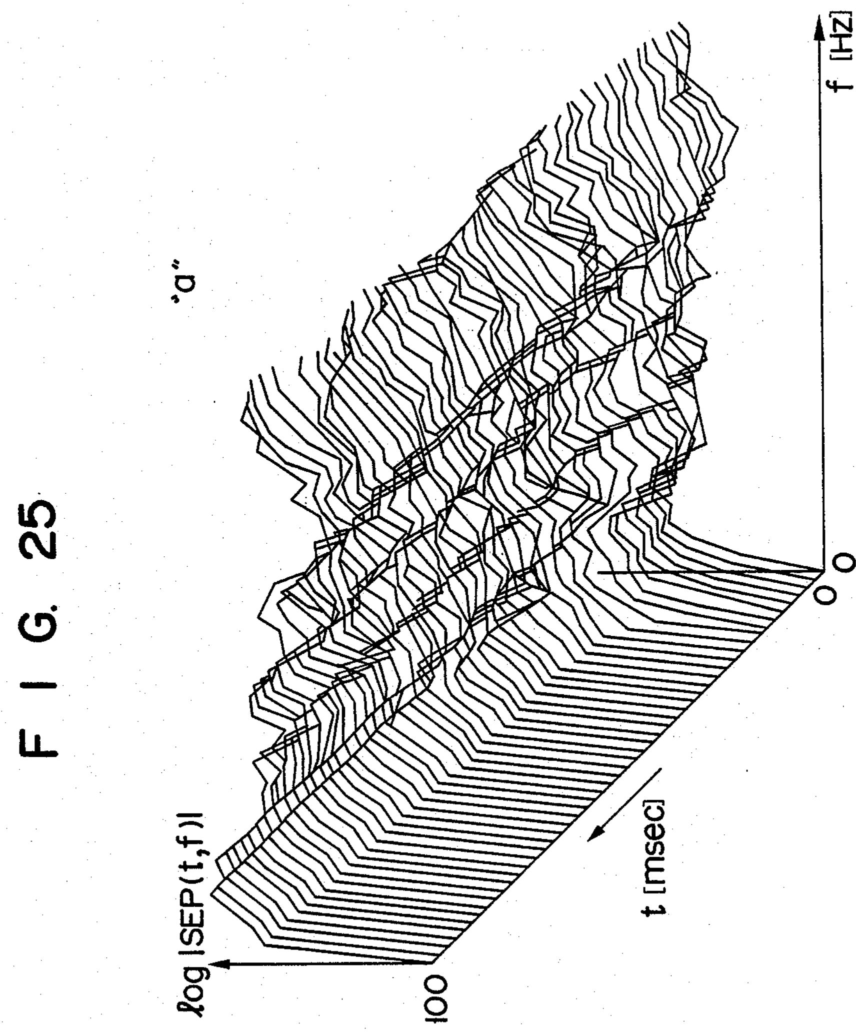
F I G. 25
"a"
log |SEP(t,f)|
f [Hz]
t [msec]
100
0
0

F I G. 28
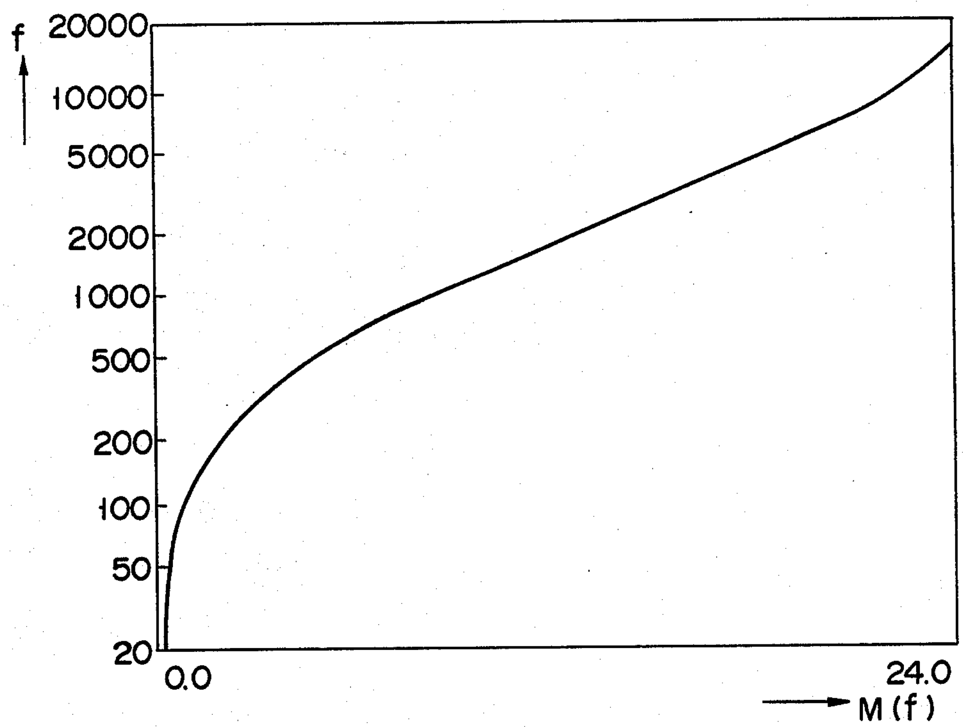
F I G. 29
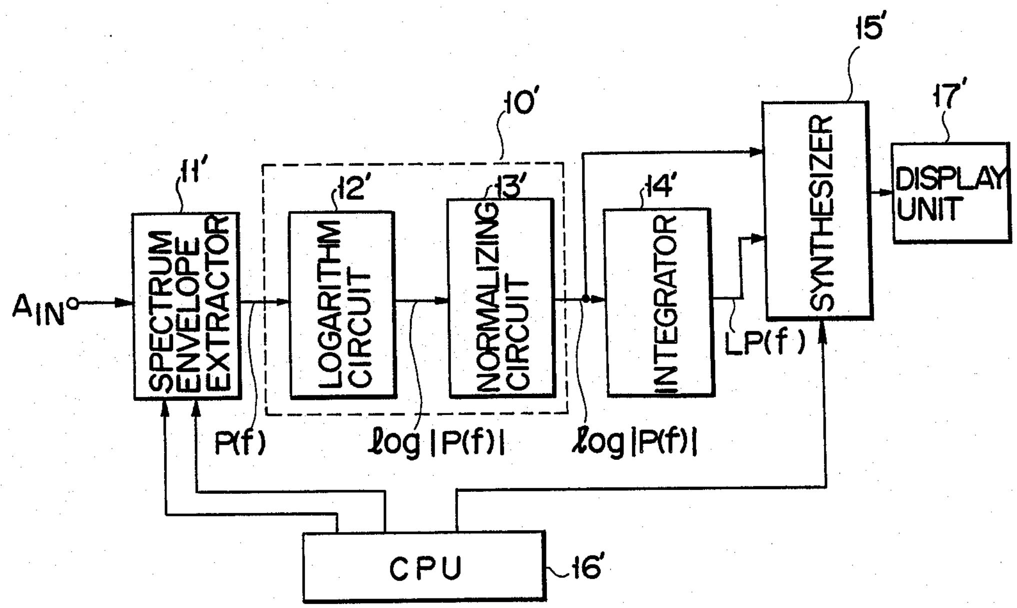

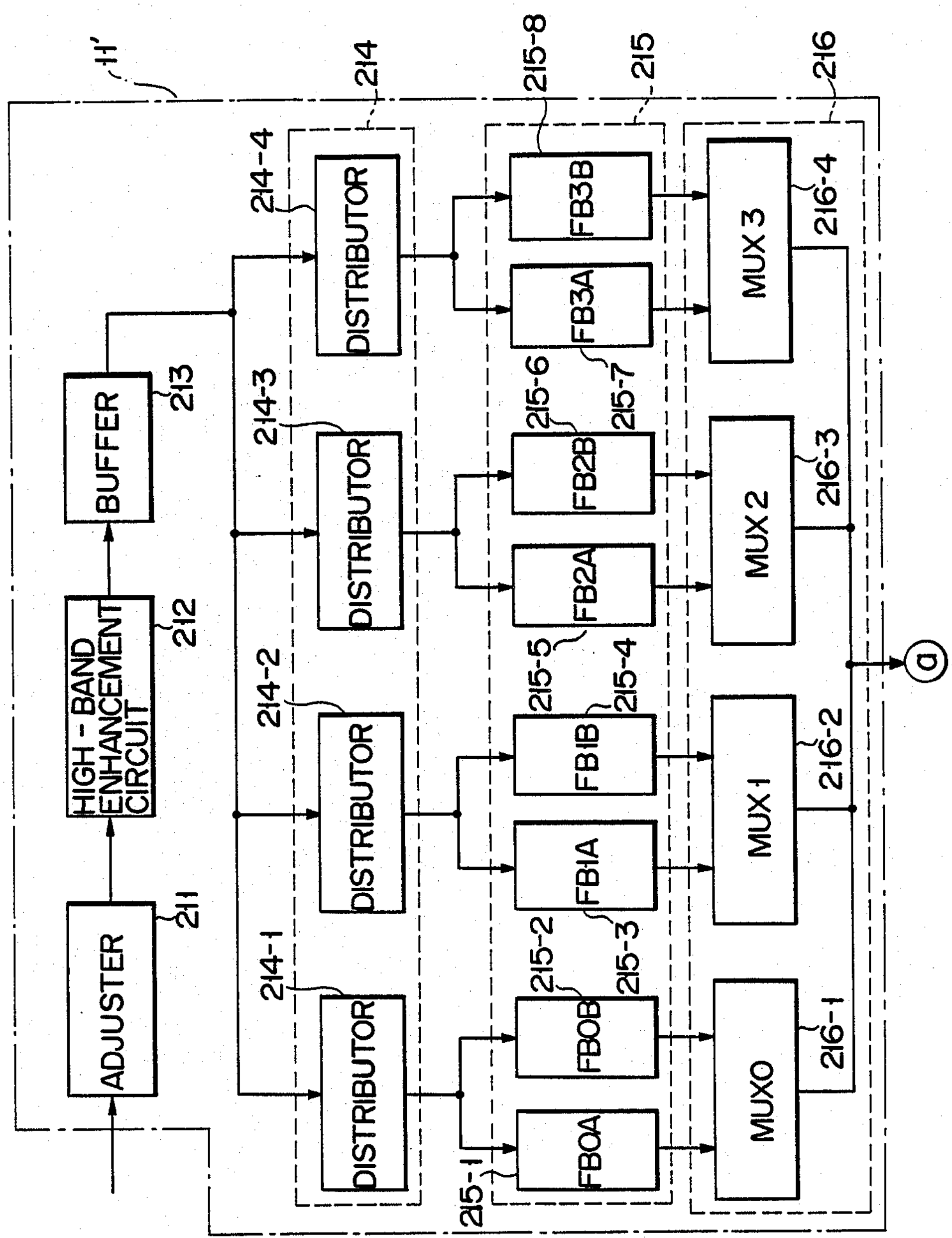
F I G. 30

METHOD OF ANALYZING INPUT SPEECH AND SPEECH ANALYSIS APPARATUS THEREFOR

BACKGROUND OF THE INVENTION

The present invention relates to a method of analyzing an input speech signal and a speech analysis apparatus thereof.

In a conventional speech-recognition apparatus, an utterance-practicing apparatus for hearing-impaired people, a communications system using speech analysis and synthesis, or a speech synthesizing apparatus, an input speech signal is analyzed and its features are extracted, so as to perform desired processing. The input speech signal is analyzed on the basis of its frequency spectrum. Human auditory sensitivity for temporal changes in waveform of the speech signal is worse than that for the spectrum thereof. Signals having an identical spectrum are recognized as an identical phoneme.

A voiced sound portion of a speech signal has a structure of a cyclic signal generated by vibrations of the vocal cord. The frequency spectrum of the voiced sound has a harmonic spectrum structure. However, an unvoiced sound portion of the speech signal does not accompany vibrations of the vocal cord. The unvoiced sound has a sound source as noise generated by an air stream flowing through the vocal tract. As a result, the frequency spectrum of the unvoiced sound does not have a cyclic structure that of the harmonic spectrum. There are two conventional speech analysis schemes in accordance with these frequency spectra. One scheme assumes a cyclic pulse source as a sound source of the input speech signal, and the other assumes a noise source. The former is known as speech analysis using cepstrum analysis, and the latter speech analysis scheme is known as speech analysis using an auto-recurrence (AR) model. According to these speech analysis schemes, microstructures are removed from the spectrum of the input speech signal, to obtain a so-called spectrum envelope.

In the analysis of the input speech signal according to the AR model or the cepstrum analysis scheme to obtain the spectrum envelope, both schemes assume a stationary stochastic process. If the phoneme changes as a function of time, such a conventional analysis scheme cannot be applied. In order to solve this problem, the signal is extracted in a short time region such that the system does not greatly change. The extracted signal is multiplied by a window function, such as a Hamming window or a Hanning window, so as to eliminate the influence of an end point, thereby obtaining a quasi-stationary signal as a function of time. The quasi-stationary signal is analyzed to obtain the spectrum envelope. This envelope is defined as the spectrum envelope at the extraction timing of the signal.

In order to obtain the spectrum of the input speech signal according to the conventional speech analysis scheme, an average spectrum of a signal portion extracted for a given length of time (to be referred to as a frame length hereinafter), is obtained. For this reason, in order to sufficiently extract an abrupt change in spectrum, the frame length must be shortened. In particular, at a leading edge of a consonant, its spectrum is spontaneously changed within several milliseconds, and the order of frame length must be several milliseconds. With this arrangement, the frame length is approximately equal to the pitch period of vibrations of the vocal cord. The precision of spectrum extraction largely depends on the timing and degree of the vocal cord pulse included within the frame length. As a result, the spectrum cannot be stably extracted.

It is assumed that the problem described above is caused since the dynamic spectrum, as a function of time, is analyzed by a model assuming a stationary stochastic process.

In conventional spectrum extraction, the time interval (to be referred to as a frame period) must be shortened upon shifting the frame position for extracting the signal, so as to follow rapid changes in the spectrum. However, if the frame period is shortened into, halves, for example, the number of frames to be analyzed is doubled. In this manner, shortening of the frame period greatly increases the amount of data to be processed. For example, the amount of data obtained by A/D-converting a 1-second continuous speech signal at a 50-μsec pitch, is 20,000. However, if the above data length is analyzed using a 10-msec frame length and a 2-msec frame period, the number of frames to be analyzed is:

$$1\ s \div 0.002\ s = 500$$

As a result, the amount of data to be analyzed is:

$$(10\ msec \div 0.05\ msec) \times 500 = 100{,}000$$

and the number of data is increased by five times.

As is described above, in a conventional speech analysis scheme based on the stationary stochastic process, abrupt changes in spectrum at a dynamic portion such as a leading edge of the consonant, cannot be stably analyzed with high precision. If the frame period is shortened, the amount of data which must be processed is greatly increased.

Another conventional method for effectively analyzing a speech signal is frequency analysis, using a filter bank. According to this analysis method, an input speech signal is supplied to a plurality of bandpass filters having different center frequencies, and outputs from the filters are used to constitute a speech-power spectrum. This method has advantages in having easy hardware arrangement and real-time processing.

Most of the conventional speech analysis methods determine spectrum envelopes of input speech signals. A method of finally analyzing the speech signal from the determined spectrum envelope is known as formant analysis, for extracting formant frequency and width from a local peak, in order to analyze the input speech signal. This analysis method is based on the facts that each vowel has a specific formant frequency and width, and that each consonant is characterized by the change in formant frequency in the transition from the consonant to a vowel. For example, five Japanese vowels ("a", "i", "u", "e", and "o") can be defined by two formant frequencies F1 and F2, F1 being the lowest formant frequency, and F2 is the next one. Being substantially equal, frequencies F1 and F2 are used for voices uttered by persons of the same sex and the about same age. Therefore, the vowels can be identified by detecting formant frequencies F1 and F2.

Another conventional method is also known, for extracting local peaks of the spectrum envelope and for analyzing these peaks, based on their frequencies and temporal changes. This method is based on the assumption that phonemic features appear in the frequencies of local peaks of the vowel portion, or in the temporal changes in local peaks of the consonant portion.

Still another conventional method is also proposed, for defining a spectrum envelope curve itself as a feature parameter of the speech signal and to use the feature parameters in the subsequent identification, classification, or display.

In the analysis of a speech signal, it is important to extract the spectrum envelope. Excluding the spectrum envelope itself, the formant frequency and width derived from the envelope, and the frequency and transition of the local peak can be used as feature parameters.

When a person utters a sound, its phoneme is assumed to be defined by resonance/antiresonance of the vocal tract. For example, a resonant frequency appears as a formant on the spectrum envelope. Therefore, if different persons have an identical vocal tract structure, substantially identical spectra are obtained for an identical phoneme.

However, in general, if persons, for example, male vs. female, or child vs. adult, have greatly different vocal tract lengths, the resonant or antiresonant frequencies are different from each other, and the resultant spectrum envelopes are different accordingly. In this case, the local peaks and formant frequencies are shifted from each other for an identical phoneme. This fact is inconvenient for an analysis aiming at extracting identical results for identical phonemes, regardless of the speakers, as in the cases of speech recognition and visual display of speech for hearing-impaired persons.

In order to solve the above problems, two conventional methods are known. One is a method for preparing a large number of standard patterns, and the other is a method for determining a formant frequency ratio.

In the former method, a large number of different spectrum envelopes of males and females, adults and children, are registered as the standard patterns. Unknown input patterns are classified on the basis of similarities between these unknown patterns and the standard patterns. Therefore, a large number of different indefinite input speech signals can be recognized. According to this method, in order to recognize similarities between the standard patterns and any input speech patterns, a very large number of standard patterns must be prepared. In addition, it takes a long period of time to compare input patterns with the standard patterns. Furthermore, this method does not extract the results normalized by the vocal tract lengths, and therefore cannot be used for displaying phonemic features not dependent on the vocal tract lengths.

The latter method, i.e., the method of determining the formant frequency ratio, is known as a method of extracting phonemic features not based on the vocal tract lengths. More specifically, among the local peaks in the spectrum envelope, first, second, and third formant frequencies F1, F2, and F3, which are assumed to be relatively stable, are extracted for vowels, and ratios F1/F3 and F2/F3 are calculated to determine the feature parameter values. If the vocal tract length is multiplied by a, the formant frequencies become 1/a times, i.e., F1/a, F2/a, and F3/a. However, the ratios of the formant frequencies remain the same.

The above method is effective if the first, second, and third formants of the vowels can be stably extracted. However, if these formants cannot be stably extracted, the analytic reliability is greatly degraded. Furthermore, this method is not applicable to consonants. That is, the formant as the resonant characteristics of the vocal tract cannot be defined for the consonants, and the local peaks corresponding to the first, second, and third formants cannot always be observed on the spectrum envelope. As a result, frequencies F1, F2, and F3 cannot be extracted or used to calculate their ratios. At a leading or trailing edge of a vowel as well as for a consonant, the formants are not necessarily stable, and a wrong formant frequency is often extracted. In this case, the ratio of the formant frequencies is discretely changed and presents a completely wrong value. Therefore, the above method is applicable to only stable portions of vowels of the speech signal. Another method must be used to analyze the leading and trailing edges of the vowels and the consonants. Since different extraction parameters must be used for the stable portions of the vowels and other portions including the consonants, it is impossible to describe continuous changes from a consonant to a vowel. In short, the method of calculating the ratio of the formant frequency is applicable only to stationary vowel portions.

No conventional methods have been proposed to extract feature parameters inherent to phonemes from a large number of indefinite spectrum envelopes derived from different vocal tract lengths.

SUMMARY OF THE INVENTION

The present invention has been made in consideration of the above situation. It is an object of the present invention to provide a method for calculating analytic results inherent to phonemes, without being influenced by different vocal tract lengths of speakers, and for calculating changes in the spectrum envelope in the transition from a consonant to a vowel.

According to an aspect of the present invention, there is provided a method comprising: receiving a spectrum envelope, to transform the spectrum envelope such that the spectrum envelope has a suitable magnitude, and to generate the transformed spectrum envelope; receiving the transformed spectrum envelope, to integrate the transformed spectrum envelope with respect to a predetermined variable, and to generate an integrated data; receiving the transformed spectrum envelopes and the integrated data, to project the transformed spectrum envelope with respect to integrated data.

It is another object of the present invention to provide a speech analysis apparatus for practicing the above method.

According to another aspect of the present invention, there is provided an apparatus comprising: transforming means for receiving a spectrum envelope, for transforming the spectrum envelope such that the spectrum envelope has a suitable magnitude, and for generating a transformed spectrum envelope; integrating means for receiving the transformed spectrum envelope, and for integrating the transformed spectrum envelope with respect to a predetermined variable to generate integrated data; and projecting means for receiving the transformed spectrum envelopes and projecting the transformed spectrum envelope with respect to integrated data.

According to the present invention, the analysis is stably performed for a consonant as well as for a leading edge of a vowel, to allow smooth displaying of the spectral changes.

The problem of variations in analysis results, caused by the different vocal tract lengths of the speakers, can be solved. Thus, the best results inherent to the phonemes can always be obtained. In this case, according to the present invention, the method is arbitrarily applied to any spectrum envelope portion of the input speech signal, regardless of vowels and consonants, and voiced and unvoiced sounds. Since the analysis results are independent of extraction precision and stability of the formant frequency, the method is applicable to the entire range of the input speech signal. In particular, the changes in spectrum envelope in the transition from a consonant to a vowel can be determined without being influenced by different individual vocal tract lengths, unlike in the conventional method.

According to the present invention, a normalized logarithmic spectrum envelope is used as a function to be integrated in place of the spectrum envelope and the logarithmic spectrum envelope, and thus, the influences of voice magnitudes for identical phonemes can be eliminated.

When transformation is performed by integrating the envelope with respect to mels, a unit of pitch, such transformation is compatible with human auditory sensitivity, thus minimizing the contributions of low-frequency components.

According to a spectrum envelope extractor in the speech analyzing apparatus of the present invention, a time frequency pattern of a frequency spectrum in the analysis frame can be extracted, although conventional speech analysis provides only an average spectrum of the input speech signal in the analysis frame. Therefore, abrupt changes in spectrum can be stably extracted, with high precision.

The time frequency pattern of the frequency spectrum thus obtained has a definite meaning. Artificial parameters (analysis orders in the AR model, a cutoff quefrency in cepstrum analysis, etc.) are not included in the time frequency pattern, thus achieving high reliability.

Furthermore, since the time frequency pattern of the frequency spectrum, which is obtained from frames including the unvoiced sounds and consonants, includes many noise components, it cannot be used without modifications. According to the present invention, however, the time frequency pattern of the frequency spectrum produced by inverse Fourier transformation, is temporarily smoothed to reduce the influences of noise, thus obtaining a high-quality time frequency pattern output as a function of time.

BRIEF DESCRIPTION OF THE DRAWINGS

FIG. 1 is a block diagram of a speech analysis apparatus according to an embodiment of the present invention;

FIG. 2A is a block diagram of a spectrum envelope extractor in the apparatus of FIG. 1;

FIG. 2B is a block diagram showing a modification of the spectrum envelope extractor in FIG. 2A;

FIG. 5 is a graph obtained by plotting data of FIG. 4 on the basis of formant ratios;

FIGS. 15A to 15D are schematic views illustrating a model for generation of a speech signal;

FIG. 20 is a flow chart for obtaining the spectrum envelope;

FIG. 25 is a graph showing a time frequency pattern of a frequency spectrum obtained by this embodiment;

FIG. 28 is a graph showing the relationship between the scale of mels and the frequency;

FIG. 29 is a block diagram of a speech analysis apparatus according to another embodiment of the present invention;

FIGS. 30 and 31 are detailed block diagrams of an arrangement shown in FIG. 29;

DETAILED DESCRIPTION OF THE PREFERRED EMBODIMENTS Detailed

A speech analysis apparatus according to an embodiment of the present invention will be described with reference to the accompanying drawings.

FIG. 1 is a block diagram showing an arrangement of an embodiment. Before describing the embodiment with reference to FIG. 1, the principle of the embodiment of the present invention will be described with reference to FIGS. 3 to 7B.

Figure 3:
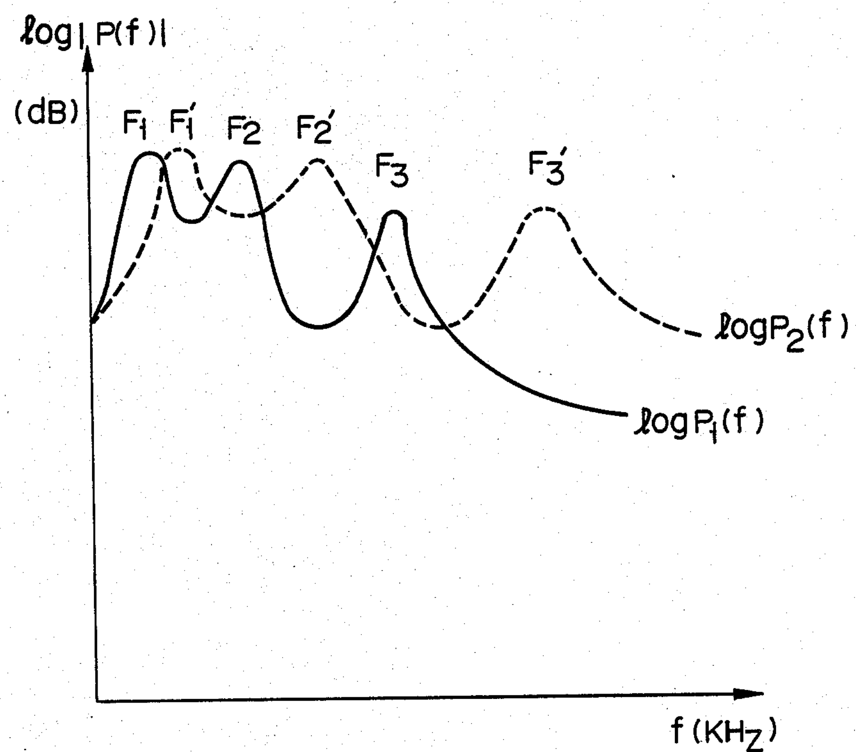
FIG. 3 is a graph showing vocal tract in logarithmic spectrum envelopes caused by vocal tract length differences.

Comparison results of vowel spectrum envelopes with respect to different vocal tract lengths will be illustrated in FIG. 3. FIG. 3 shows logarithmic plotting of spectrum envelope P(f) of an identical phoneme from two different vocal tract lengths l1 and l2. Referring to FIG. 3, in a frequency range from several hundreds of hertz to about 5 kHz, spectrum envelope Pl(f) of long vocal tract length l1 is a multiple, along the frequency (f) axis, of spectrum envelope P2(f) (log P2(f) in FIG. 3) of short vocal tract length l2 with reference to a fixed origin. However, in the range of 0 Hz to several hundreds of hertz, the difference between envelopes Pl(f) and P2(f) is typical, and a similarity therebetween is reduced. This frequency range is based on differences in individual tone colors and is not so important in speech analysis. The vocal tract lengths are proportional to resonant frequencies. If a ratio l1/l2 of length l1 to length l2 is given as r, a relationship between spectrum envelopes Pl(f) and P2(f) is obtained when the magnitudes thereof are normalized in the frequency range of several hundreds of hertz to 5 kHz:

$$\overline{\log|Pl(f)|} \approx \overline{\log|P2(rf)|} \tag{1}$$

Magnitude-normalized logarithmic spectrum envelopes $\overline{\log|Pl(f)|}$ and $\overline{\log|P2(rf)|}$ are used in place of spectrum envelopes Pl(f) and P2(f) themselves to normalize the magnitudes of the input speech signals.

In this case, if first to third formants are extracted, their frequencies F1, F2, F3, F1', F2', and F3' are plotted as shown in FIG. 3. Since these frequencies satisfy the following relation:

$$F1'/F1 \approx F2'/F2 \approx F3'/F3 \approx r \tag{2}$$

the ratios of formant frequencies F are kept unchanged (the frequencies given in relations (3)) as follows:

$$F1/F2 \approx F1'/F2'$$

$$F1/F3 \approx F1'/F3' \tag{3}$$

Figure 4:
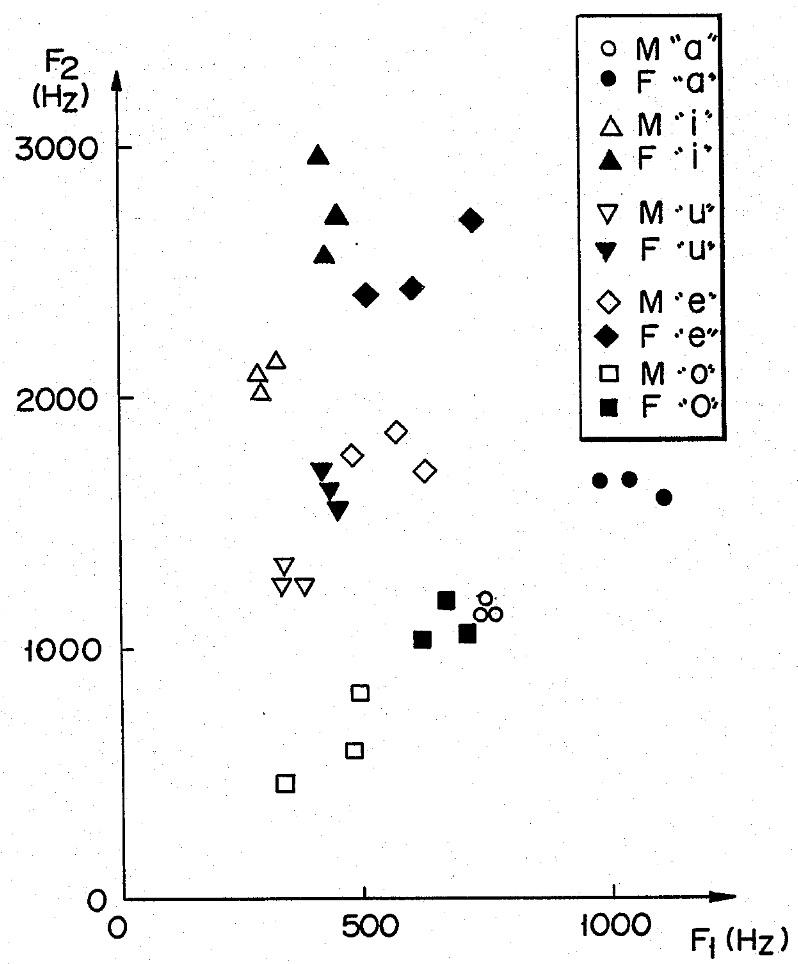
FIG. 4 is a graph showing different formants of a male and a female.

The above fact will be proven by the results (FIG. 4 and 5) of actual measurements. FIG. 4 shows a distribution of F1 and F2 of males and females in their twenties to thirties. As is apparent from FIG. 4, the actual distributions for the males and females are greatly different. For example, the formant frequency of a male utterance of Japanese phoneme "a" is the same as that of a female utterance of Japanese phoneme "o", and the formant frequency of a male utterance of Japanese phoneme "e" is the same as that of a female utterance of Japanese phoneme "u".

FIG. 5 shows the distributions of ratios F1/F3 and F2/F3. Referring to FIG. 5, in the formant frequency ratios, it is found that the differences caused by the sex difference between males and females can be solved.

In the frequency range of several hundreds of hertzs to about 5 kHz regardless of the stationary state of the spectrum envelope, transform R given by equation (4) is performed for spectrum envelope P(f) to multiply values on the frequency axis by a constant, i.e., to obtain r·f:

$$P(f) \xrightarrow{R} P'(f) = P(r \cdot f) \tag{4}$$

In this case, if transform (U) for projecting spectrum envelopes P(f) and P(r·f) into an unchanging functional space is found, spectrum envelopes P(f) belonging to an identical phoneme must have identical shapes in this space regardless of vocal tract lengths l.

Figures 6A, 6B, 6C, 6D, 6E, 6F:
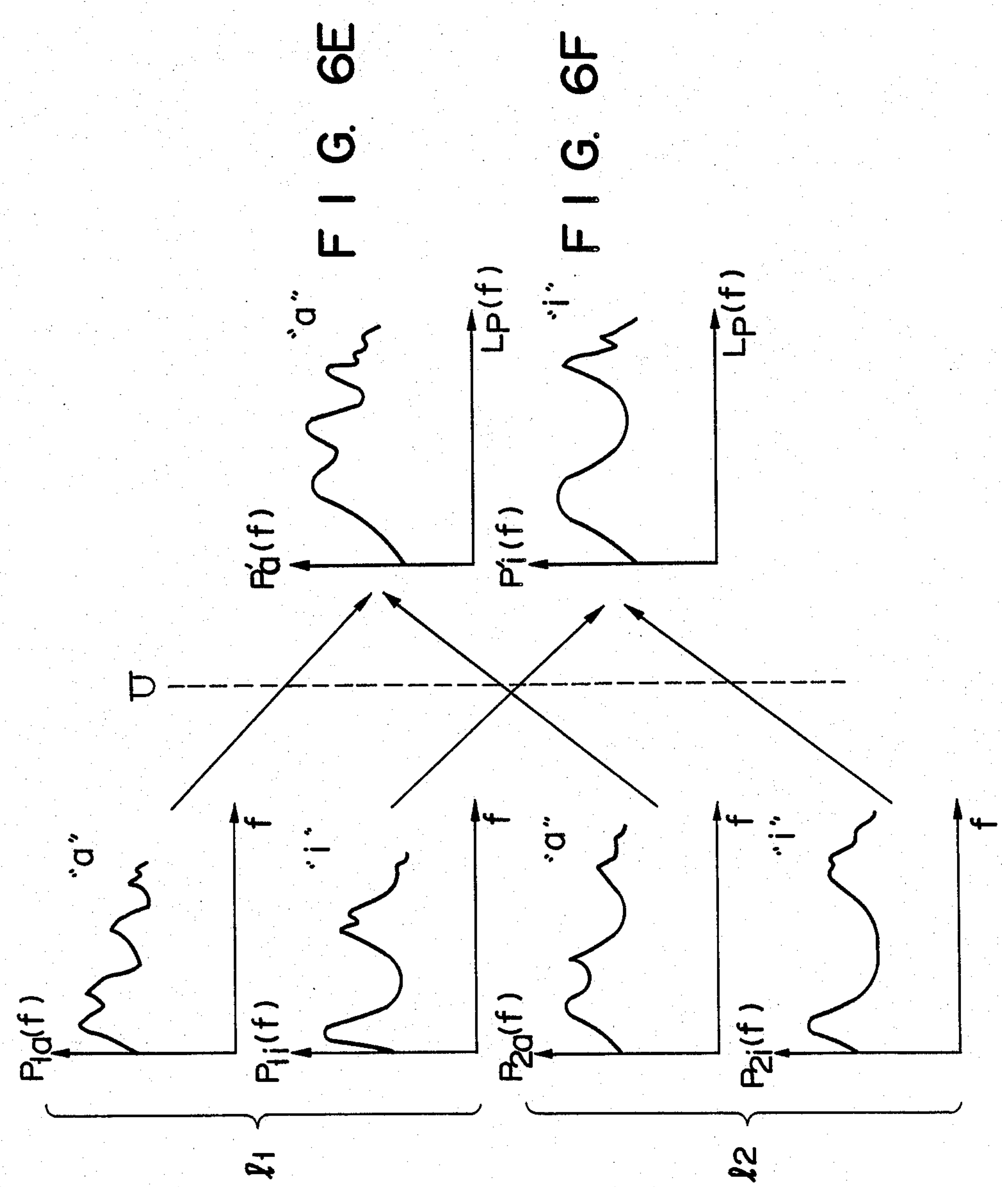
FIGS. 6A to 6F are graphs for explaining the principle of the present invention.

The above operation is described as the principle in FIGS. 6A to 6F. These figures show that, although a difference is present in spectrum envelopes P(f) of Japanese phoneme "a" or "i" caused by different vocal tract lengths l, these envelopes are transformed to spectrum envelopes P'(f) having an identical distribution by means of transform U. More specifically, as shown in FIG. 6A, spectrum envelope Pla(f) (FIG. 6A) of Japanese phoneme "a" for length l1 and spectrum envelope P2a((f) (FIG. 6C) thereof for length l2 are transformed into spectrum envelopes P'a(f) (FIG. 6E) of an identical shape by transform U. Similarly, spectrum envelope Pli(f) (FIG. 6B) of Japanese phoneme "i" and P2i(f) (FIG. 6D) thereof are transformed into spectrum envelopes P'i(f) (FIG. 6F) of an identical shape.

In this embodiment, transform U is performed as follows. If a magnitude-normalized logarithmic spectrum envelope is integrated on the logarithmic scale along the frequency axis and the resultant integral is defined as L(f), it is given by $$L(f) = \int_{\epsilon}^{f} \overline{\log|P(k)|}\, d\log k \tag{5}$$

wherein $\epsilon$ is a very small positive value near 0 and is determined by conditions to be described later.

L(f) in equation (5) depends on the function of P(f) and is rewritten as LP(f). Transform of equation (4) is performed for LP(f) to obtain:

$$LP'(f) = \int_{\epsilon}^{f} \overline{\log|P'(k)|}\, d\log k = \int_{\epsilon}^{f} \overline{\log|P(r \cdot k)|}\, d\log k$$

for h=r·k, then k=h/r and logk=logh−logr, therefore, dlogk=dlogh−dlogr. In this case, since r is the constant, dlogk=dlogh therefore $$LP'(f) = \int_{r\epsilon}^{rf} \overline{\log|P(h)|}\, d\log k = \int_{\epsilon}^{rf} \overline{\log|P(k)|}\, d\log k - \int_{\epsilon}^{r\epsilon} \overline{\log|P(k)|}\, d\log k \tag{6}$$

If the second term of the right-hand side of equation (6) is sufficiently small, then $$LP'(f) \approx LP(r \cdot f) \tag{7}$$

Assume function (P(f),LP(f)) obtained by plotting spectrum envelopes P(f) and LP(f) using frequency f as a parameter:

$$(P(f),LP(f)) = (P(r \cdot f),LP(r \cdot f)) = (P'(f),LP'(f)) \tag{8}$$

ps therefore $$(P(f),f) \xrightarrow{U} (P(f),LP(f)) \tag{9}$$

It is thus apparent that transform U projects transform R of equation (4) into the unchanging functional shape. If normalized logarithmic spectrum envelope $\overline{\log|P'(f)|}$ is proportionally elongated or compressed along the frequency axis with respect to normalized logarithmic spectrum envelope $\log\overline{|P(f)|}$, the replacement of the logarithmic frequency axis with integral L(f) of equation (5) absorbs the deviations of the normalized logarithmic spectrum envelopes on the frequency axis.

Figures 7A, 7B:
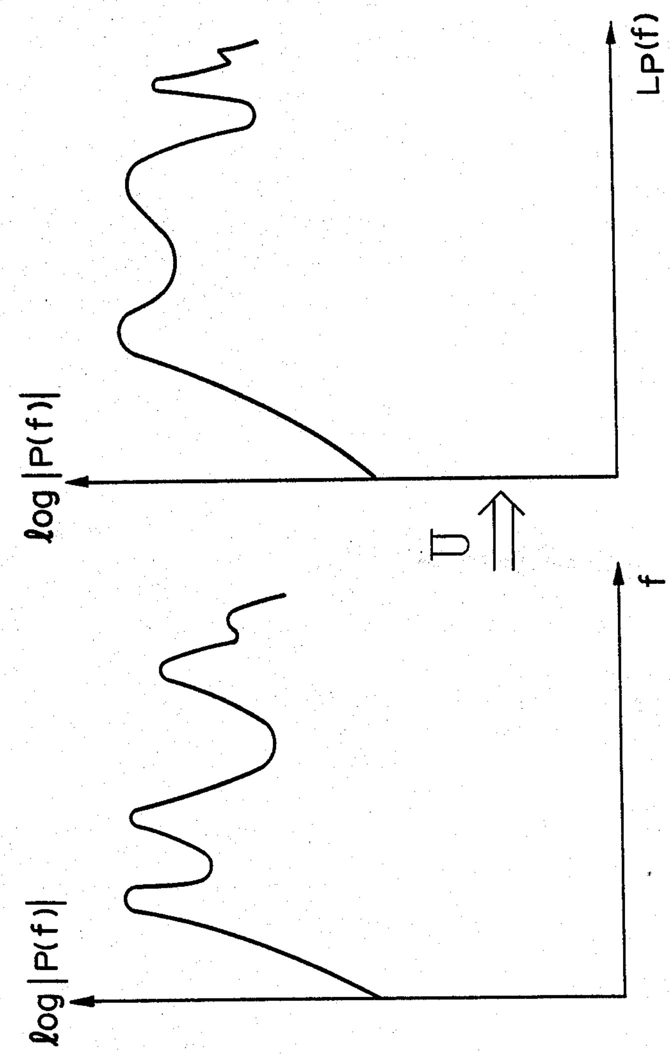
FIG. 7A and 7B are graphs for explaining transform U.

FIGS. 7A and 7B are views for explaining the principle of transform U. Logarithmic spectrum envelope log|P(f)| is used as envelope data to be described later in place of spectrum envelope P(f). Transform U is performed for the logarithmic spectrum envelope of FIG. 7A to obtain a spectrum envelope of FIG. 7B. In this case, equation (8) can be rewritten as follows:

$$(\log|(P(f)|, LP(f)) = (\log|P'(f)|, LP'(f)) \quad (10)$$

If normalized logarithmic spectrum envelope $\overline{\log|P(f)|}$ is used in place of spectrum envelope P(f) or logarithmic spectrum envelope log|P(f)|, equation (8) is rewritten as follows:

$$(\overline{\log|(P(f)|}, LP(f)) = (\overline{\log|P'(f)|}, LP'(f)) \quad (11)$$

The condition for neglecting the second term of the right-hand side of equation (6) will be described below. The condition is determined by evaluating integral I given by equation (12) since the actual range of ratio r falls within the range of ½ to about 2, and the normalized logarithmic spectrum envelope in the range of $\epsilon$ to $2\epsilon$ on the frequency axis is substantially constant, i.e., approximately a constant:

$$I = \int_{\epsilon}^{2\epsilon} \overline{\log|P(f)|}\, d\log f \approx \log|(P(\epsilon)| \cdot \log 2 \quad (12)$$

The magnitude of the speech spectrum envelope is greatly reduced at a frequency smaller than half of the pitch frequency. If about 100 Hz is used as $\epsilon$ in equation (6), it is apparent from equation (12) that the second term of the right-hand side in equation (6) can be neglected. However, if $\epsilon$ is excessively small, the influence of small frequency components on integral L(f) given by (5) is excessively large. In this case, analysis sensitivity is increased near the origin of the spectrum. Therefore, $\epsilon$ must not be less than 10 Hz, and preferably falls within the range of 10 Hz to 100 Hz.

The principle of this embodiment has been described. The arrangement for processing the above operation will be described with reference back to FIG. 1.

Referring to FIG. 1, spectrum envelope extractor 11 extracts spectrum envelope P(f) of input speech signal AIN. Various spectrum envelope extraction schemes may be used, such as extraction in AR model speech analysis, extraction in cepstrum speech analysis, extraction in speech frequency analysis with a filter bank, and so on.

Logarithm circuit 12 converts the magnitude of spectrum envelope P(f) extracted by extractor 11 into a logarithmic value. Normalizing circuit 13 normalizes the magnitude of logarithmic spectrum envelope log|P(f)| output from logarithm circuit 12. Examples of the method for normalizing the magnitude of logarithmic spectrum envelope log|P(f)| are a method using automatic gain control (AGC), and a method of differentiating logarithmic spectrum envelope log|P(f)| with frequency f to eliminate a constant term from the envelope log|P(f)|, integrating a differentiated value, and adding a constant value to the integrated value. Transform section 10 is constituted by logarithm circuit 12 and normalizing circuit 13.

Integrator 14 integrates normalized logarithmic envelope $\log\overline{|(P(f)|}$ (output from normalizing circuit 13) using the frequency on the logarithmic scale as a variable. More specifically, integrator 14 integrates spectrum envelope $\overline{\log|P(f)|}$ according to the integral function of equation (5). It should be noted that the e value is given as 50 Hz.

Projection circuit 15 receives logarithmic spectrum envelope log|P(f)| output from logarithm circuit 12 and the integrated result from integrator 14, projects |P(f)| onto integral function L(f) (=LP(f)) by using frequency f, as shown in FIGS. 7A and 7B, and displays the projection result. In projection circuit 15, LP(f) is plotted along the x-axis of the orthogonal coordinate system and logarithmic spectrum envelope log|P(f)| is plotted along the y-axis thereof, and the parameters are displayed using frequency f, thereby patterning the analysis results of input speech signals AIN.

In processing of projection circuit 15, as is apparent from equations (10) and (11), spectrum envelope P(f) or normalized logarithmic spectrum envelope $\overline{\log|P(f)|}$ may be used as the value plotted along the y-axis. Alternatively, normalized spectrum envelope $\overline{P(f)}$ may be used. According to the present invention, it is essential for envelope data subjected to projection to indicate at least the four patterns described above.

In processing of projection circuit 15, envelope data may be plotted along the x-axis, and LP(f) may be plotted along the y-axis.

Figure 8A:
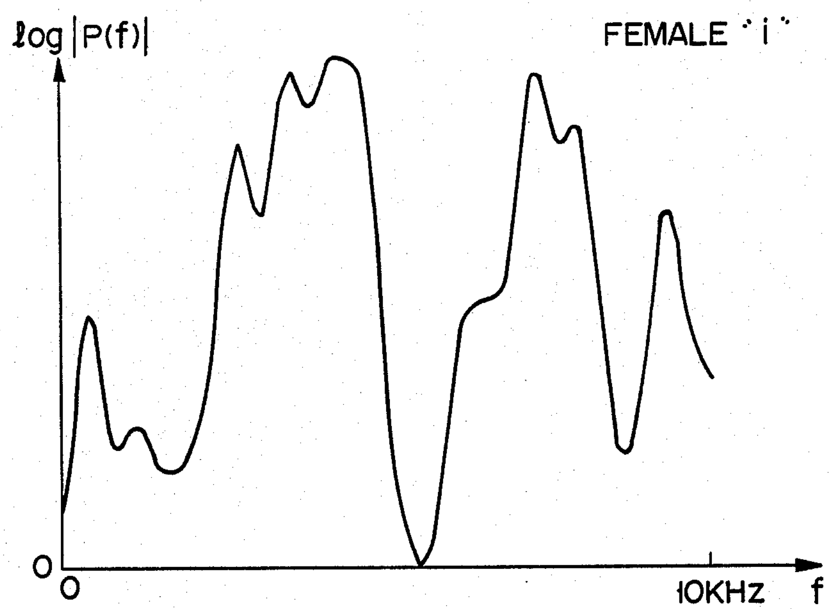
FIGS. 8A and 8B are graphs showing different male and female spectrum envelopes.
Figure 8B:
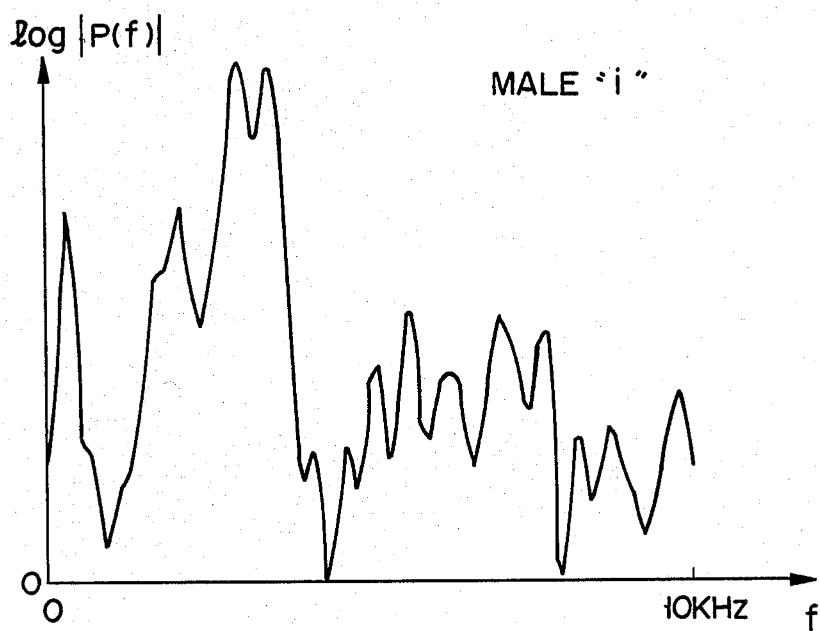

An example of practical measurement by speech analysis according to this embodiment will be described below. FIGS. 8A and 8B respectively show logarithmic spectrum envelopes $\overline{\log|P(f)|}$ of male and female utterances of Japanese phoneme "i". These envelopes $\overline{\log|P(f)|}$ may be determined as follows.

Speech signal AIN input at a condenser microphone is input to extractor 11 and sampled at a sampling frequency of 50 μsec to obtain a 12-bit digital signal. A 8-kword wave memory is used to sample the speech signal.

Extractor 11 determines spectrum envelope P(f) by analyzing the cepstrum of signal AIN. Cepstrum analysis is performed as follows. A 1024-point frame of a stable vowel portion is differentiated, and a differentiated result is multiplied with a Hamming window. The result is then Fourier-transformed by an FFT algorithm, thereby obtaining spectrum envelope P(f).

Logarithm circuit 12 calculates a logarithm of the absolute value of envelope P(f). The logarithm is subjected to inverse Fourier transform to obtain its cepstrum. The cepstrum is sampled with a rectangular window having a cutoff period of 1.7 to 2.5 msec on the quefrency axis. The result is then Fourier-transformed to obtain logarithmic spectrum envelope log|P(f)|.

In order to obtain logarithmic spectrum envelope log|P(f)|, the cutoff range on the quefrency axis is selected in correspondence with the pitch frequency. Furthermore, in order to normalize the magnitude of envelope log|P(f)|, envelope log|P(f)| is calculated after a value of the 0th order of the cepstrum is converted into a predetermined value.

The logarithmic spectrum envelopes shown in FIGS. 8A and 8B are obtained as described above. When these envelopes in FIGS. 8A and 8B are compared, their distributions are similar to each other within the range below about 5 kHz. However, the female spectrum shape is elongated along the frequency axis as compared with the male spectrum shape.

Figure 9A:
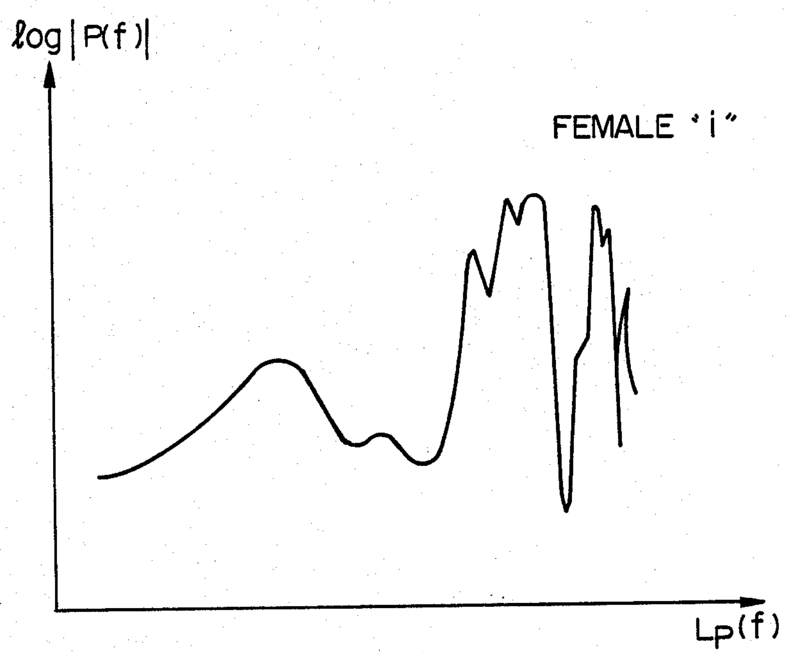
FIGS. 9A and 9B are graphs obtained by performing transform U of the spectrum envelopes of FIGS. 8A and 8B.
Figure 9B:
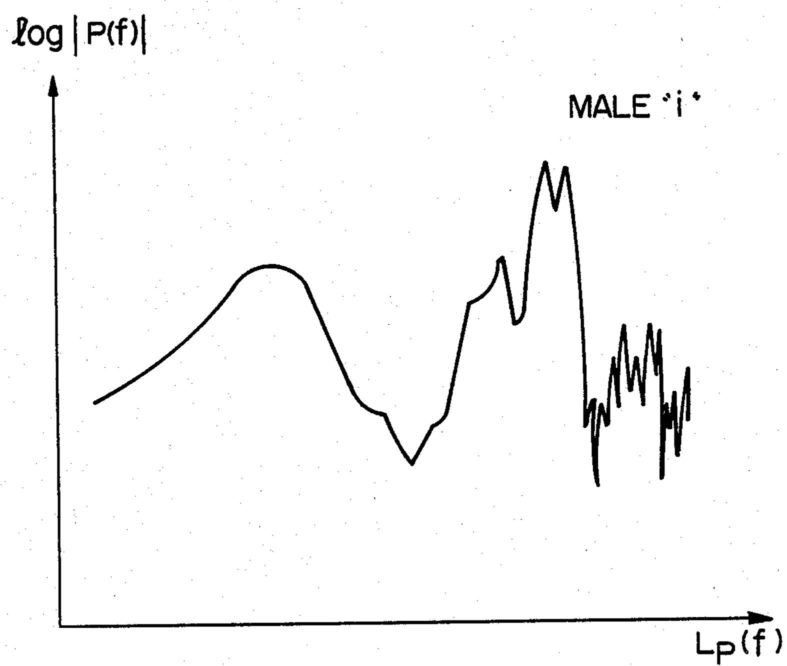

LP(f) (expressed by equation (5)) for this envelope $\overline{\log|P(f)|}$ is calculated when $\epsilon$ is given as 50 Hz. The calculated values are plotted along the x-axis, and envelopes $\overline{\log|P(f)|}$ are plotted along the y-axis, as shown in FIGS. 9A and 9B. Although the peak heights and minute nuances are different in these graphs, the deviations along the frequency direction in FIGS. 8A and 8B are apparently eliminated.

Figure 10A:
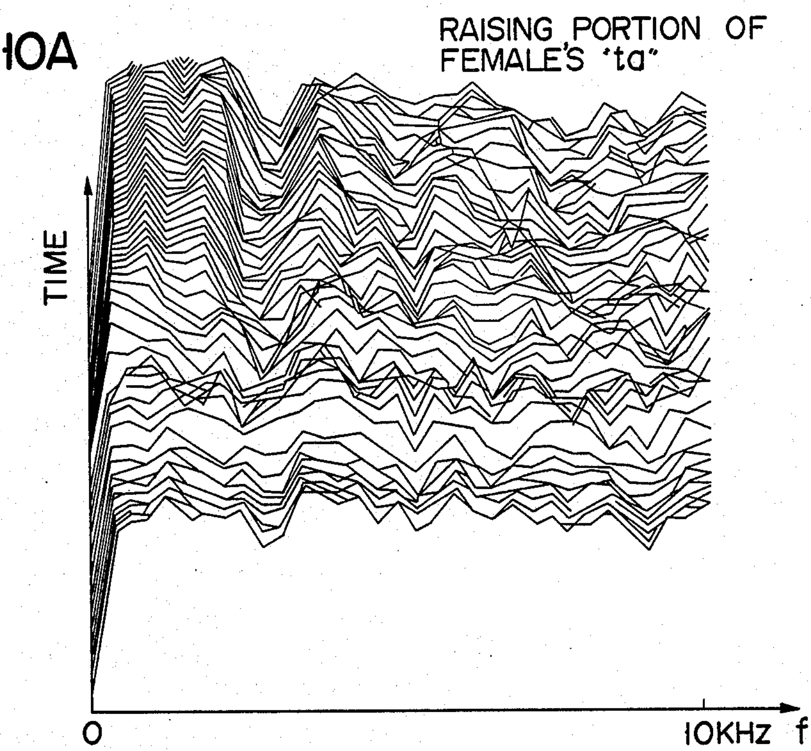
FIG. 10A is a graph showing a spectrum envelope of a word "ta" uttered by a female.
Figure 10B:
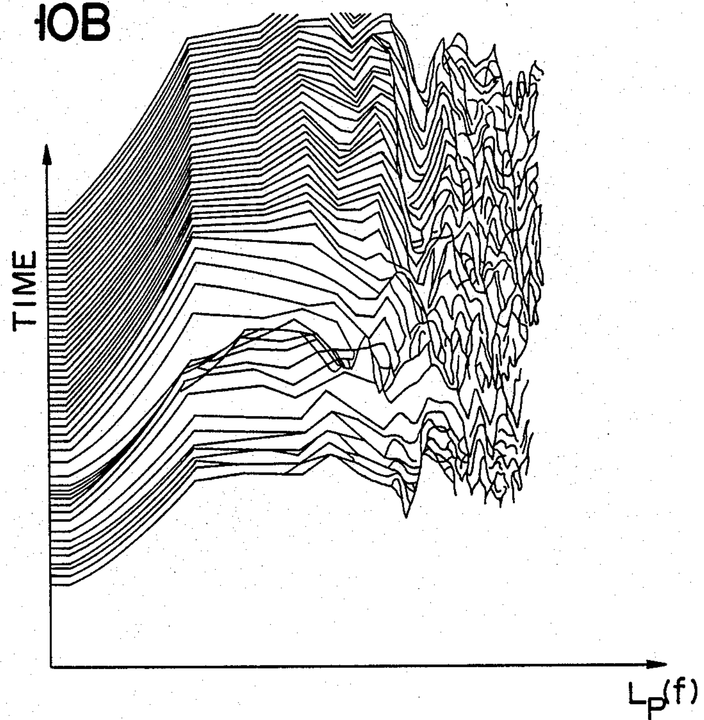
FIG. 10B is a graph obtained by performing transform U of the spectrum envelope of FIG. 10A.

FIG. 10A shows time serial changes of logarithmic spectrum envelope $\log|P(f)|$ obtained by shifting the frame position as a function of time with respect to the leading portion of Japanese phoneme "ta" uttered by a female. FIG. 10B shows time serial changes of speech analysis results by transforming (U) logarithmic spectrum envelope $\log|P(f)|$ shown in FIG. 10A.

According to the measurement results, it is apparent that transform U is stably effected for a consonant and the leading edge of a vowel and is displayed.

Figure 11A:
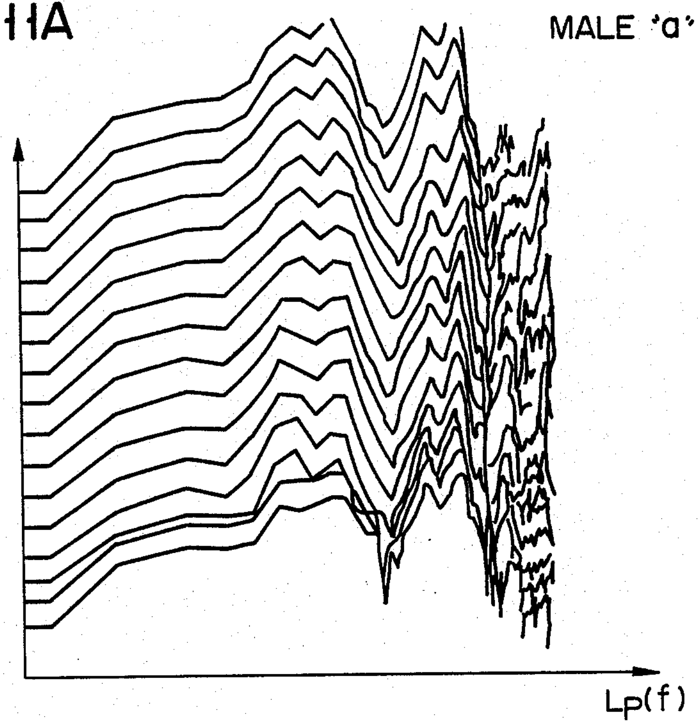
FIGS. 11A and 11B are graphs obtained by male and female utterances of Japanese phoneme "a"
Figure 11B:
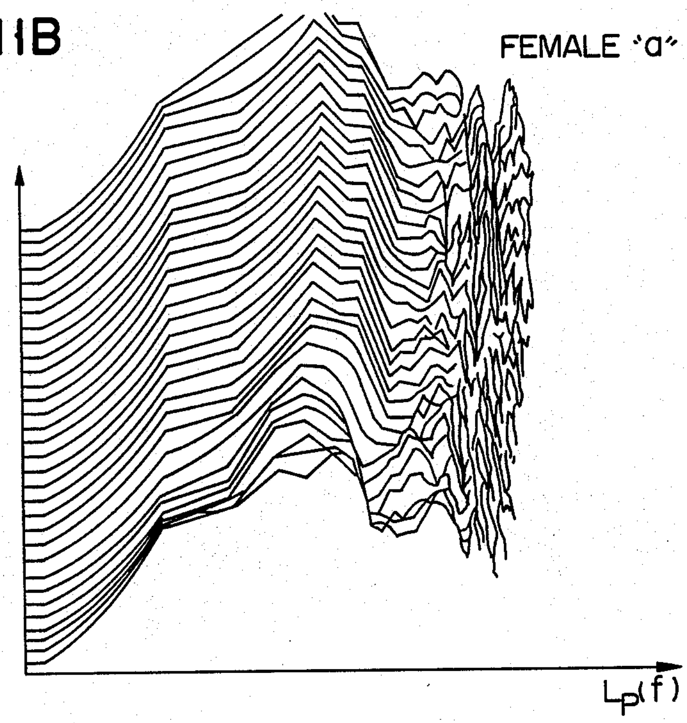

FIGS. 11A and 11B show time serial changes of male and female utterances of Japanese phoneme "a" obtained in the same manner as in FIG. 10B. When the vowel portions in FIGS. 11A and 11B and FIG. 10B are compared, the influence of a large difference between the male and female vocal tract lengths has been eliminated.

According to this embodiment as described in detail, envelope data (P(f), $\overline{\log|P(f)|}$ or $\overline{\log|P(f)|}$) is projected onto LP(f) by transform U defined by equation (5) or (9), thereby obtaining the speech analysis results.

With this arrangement, differences in analysis results caused by different vocal tract lengths l of the speakers can be eliminated. The analysis results inherent to the phonemes can be always obtained. In this case, this embodiment is applicable to the spectrum envelope of any portion of input speech signal AIN regardless of voiced and unvoiced sounds, and vowels and consonants. Furthermore, since the analysis results do not depend on extraction precision and stability of formant frequency F, the method is applicable to the entire range of input speech signal AIN. In this embodiment, particularly, changes in spectrum envelope in the transition from a consonant to a vowel can be determined without being influenced by different individual vocal tract lengths l, unlike in the conventional speech analysis method.

In this embodiment, since normalized logarithmic spectrum envelope $\overline{\log|P(f)|}$ is used in place of spectrum envelope P(f) or logarithmic spectrum envelope $\log|P(f)|$, the influence of voice magnitudes for an identical phoneme can be eliminated.

The present invention is not limited to the particular embodiment described above.

For example, in order to obtain a function to be integrated, given by equation (5), in the above embodiment, spectrum envelope P(f) output from extractor 11 is converted into a logarithm and the logarithm is normalized. However, normalization may come first and logarithm conversion may come next.

The speech analysis apparatus of the present invention may be constituted by hardware or software.

Another embodiment of the present invention will be described below.

In the previous embodiment, integrator 14 integrates the input normalized logarithmic spectrum envelope along the frequency axis. "Mel" is known as a unit of pitch for human auditory sensitivity and corresponds to a relation with a frequency of the auditory nerve system distributed on a basilar membrane of the cochlea as an auditory organ. It is assumed that the frequency analysis of the speech signal is performed in mel function M(f).

FIG. 28 is a graph showing dependency of mel function M(f) on frequency, and mel function M(f) is given, for example, as follows:

$$M(f) \approx 13\times\tan^{-1}(0.76f/1000)+3.5\times\tan^{-1}\{f/(7.5\times 1000)^2\} \quad (13)$$

In the frequency range from about 500 Hz to 5 kHz, mel function M(f) can be approximated as:

$$M(f) \approx 8.5+15\times\log(f/1000) \quad (14)$$

In the second embodiment, the first embodiment with transform U is partially utilized to realize the speech analysis apparatus. If a magnitude-normalized logarithmic spectrum envelope integrated in M(f) is given as L(f), it is given by $$L(f) = \int_0^f \overline{\log|P(k)|}\,dM(k) \quad (15)$$

wherein the integration range falls within 0 to f.

Since L(f) in equation (15) depends on P(f), it is written as LP(f). If transform given by equation (4) is performed for LP(f), then $$\begin{aligned} LP'(f) &= \int_0^f \overline{\log|P'(k)|}\,dM(k) \\ &= \int_0^f \overline{\log|P(r\cdot k)|}\,dM(k) \\ &= \int_0^f \overline{\log|P(h)|}\,dM(h/r) \\ &\text{for } h = r\cdot k \end{aligned} \quad (16)$$

In the assumed frequency range (from several hundreds of hertz to about 5 kHz), equation (14) approximates as follows:

$$dM(h/r) \approx dM(h) \quad (17)$$

Therefore $$LP'(f) \approx \int_0^{rf} \log|P(h)|\,dM(h) \quad (18)$$

hence $$LP'(f) \approx LP(r\cdot f) \quad (19)$$

Now assume function (P(f),LP(f)) obtained by expressing P(f) and LP(f) using frequency f as a parameter:

$$(P(f),LP(f)) = (p(r\cdot f),Lp(r\cdot f)$$
$$= (p'(f),Lp'(f))$$

Therefore $$(P(f),LP(f)) \xrightarrow{U} (p(f),LP(f)) \quad (20)$$

It is apparent that transform U is a projection into an approximately invariant functional space with respect to transform R in equation (4).

The principle of the second embodiment has been described. Referring back to FIG. 1, the arrangement for practicing this principle will be described.

In this embodiment, spectrum envelope extractor 11, logarithm circuit 12, and normalizing circuit 13 are the same as those of the first embodiment.

Integrator 14 integrates logarithmic spectrum envelope $\overline{\log|P(f)|}$ normalized by normalizing circuit 13 when mel function M(f) is used as a variable. More specifically, integrator 14 integrates envelope $\overline{\log|P(f)|}$ according to the integral function given by equation (15).

Projection circuit 15 receives logarithmic spectrum envelope log|P(f)| from logarithm circuit 12 and the integration output from integrator 14, projects envelope log|P(f)| with respect to frequency f onto integral function L(f) (=LP(f)), and displays the projection result. Projection circuit 15 is operated as follows. Lp(f) is plotted along the x-axis of the orthogonal coordinate system, logarithmic spectrum envelopes log|p(f)| are plotted along the y-axis, and these elements are displayed using frequency f as a parameter to pattern the analysis results of input speech signal AIN.

Spectrum envelope P(f) or normalized logarithmic spectrum envelope $\overline{\log|P(f)|}$ may be used as the values plotted along the y-axis. Alternatively, normalized spectrum envelope $\overline{P(f)}$ may also be used. It is essential to use envelope data representing at least the four patterns described above.

In processing of projection circuit 15, envelope data may be plotted along the x-axis, and LP(f) may be plotted along the y-axis.

An example of practical measurement by speech analysis according to this embodiment will be described below. FIGS. 8A and 8B respectively show logarithmic spectrum envelopes $\overline{\log|P(f)|}$ of male and female utterances of Japanese phoneme "i". These envelopes $\overline{\log|P(f)|}$ may be calculated as follows.

Speech signal AIN input at a condenser microphone is input to extractor 11 and sampled at a sampling frequency of 50 μsec to obtain a 12-bit digital signal. A 8-kword wave memory is used to sample the speech signal.

Extractor 11 determines spectrum envelope P(f) by analyzing the cepstrum of signal AIN. Cepstrum analysis is performed as follows. A 1024-point frame of a stable vowel portion is differentiated, and a differentiated result is multiplied with a Hamming window. The result is then Fourier-transformed by an FFT algorithm, thereby obtaining spectrum envelope P(f).

Logarithm circuit 12 calculates a logarithm of the absolute value of envelope P(f). The logarithm is subjected to inverse Fourier transform to obtain its cepstrum. The cepstrum is sampled with a rectangular window having a cutoff period of 1.7 to 2.5 msec on the quefrency axis. The result is then Fourier-transformed to obtain logarithmic cepstrum envelope log|P(f)|.

In order tc obtain logarithmic spectrum envelope log|P(f)|, the cutoff range on the quefrency axis is selected in correspondence with the pitch frequency. Furthermore, in order to normalize the magnitude of envelope log|P(f)|, envelope log|P(f)| is calculated after a value of the 0th order of the spectrum is converted into a predetermined value.

The logarithmic spectrum envelopes shown in FIGS. 8A and 8B are obtained as described above. When these envelopes in FIGS. 8A and 8B are compared, their distributions are similar to each other within the range below about 5 kHz. However, the female spectrum shape is elongated along the frequency axis as compared with the male spectrum shape.

Figure 12A:
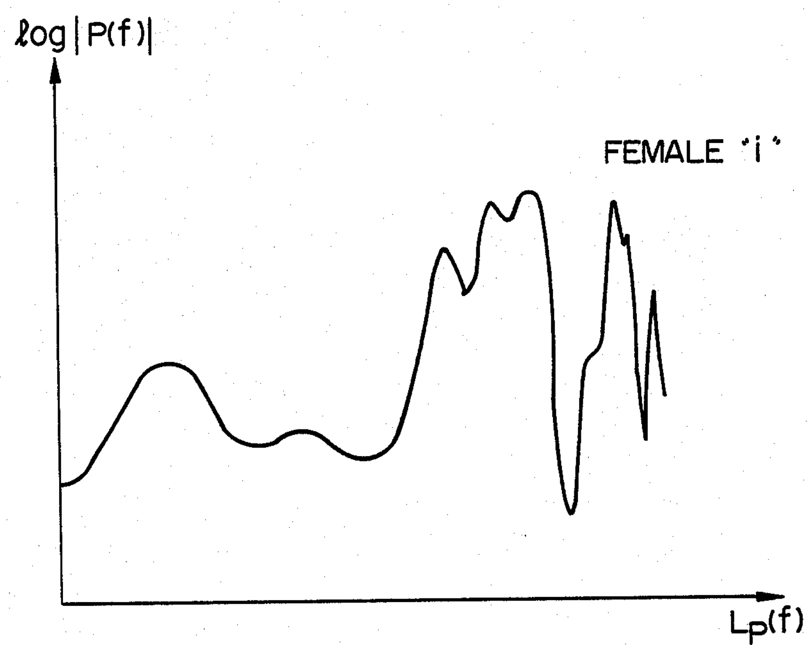
FIGS. 12A and 12B are graphs obtained by performing transform U of male and female utterances of Japanese phoneme "i" in units of mels according to another embodiment of the present invention.
Figure 12B:
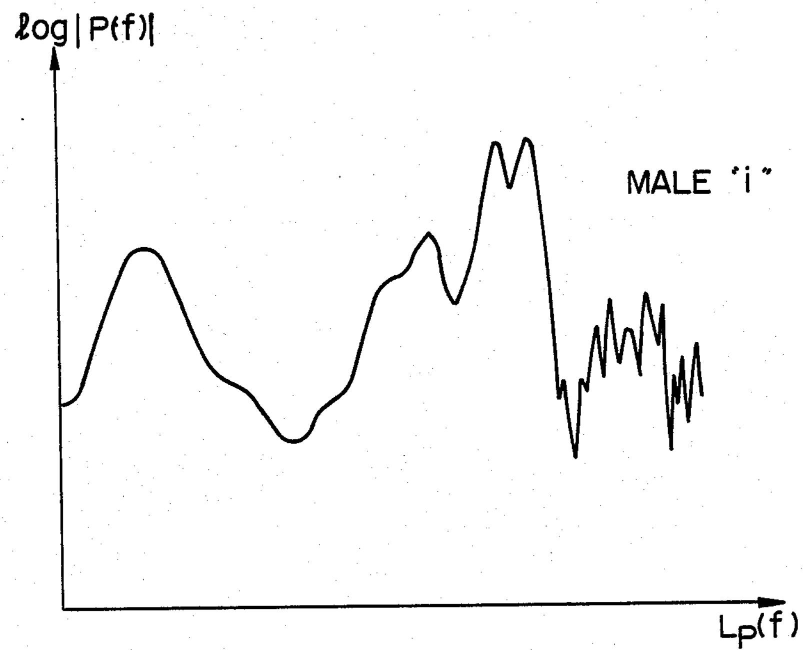

LP(f) (expressed by equation (15)) for this envelope log|P(f)| is calculated. The calculated values are plotted along the x-axis, and envelopes log|P(f)| are plotted along the y-axis, as shown in FIGS. 12A and 12B. Although the peak heights and minute nuances are different in these graphs, the deviations along the frequency direction are apparently eliminated.

It is also found that emphasis of the low-frequency range is limited, as compared with the case of FIGS. 9A and 9B.

Figure 13A:
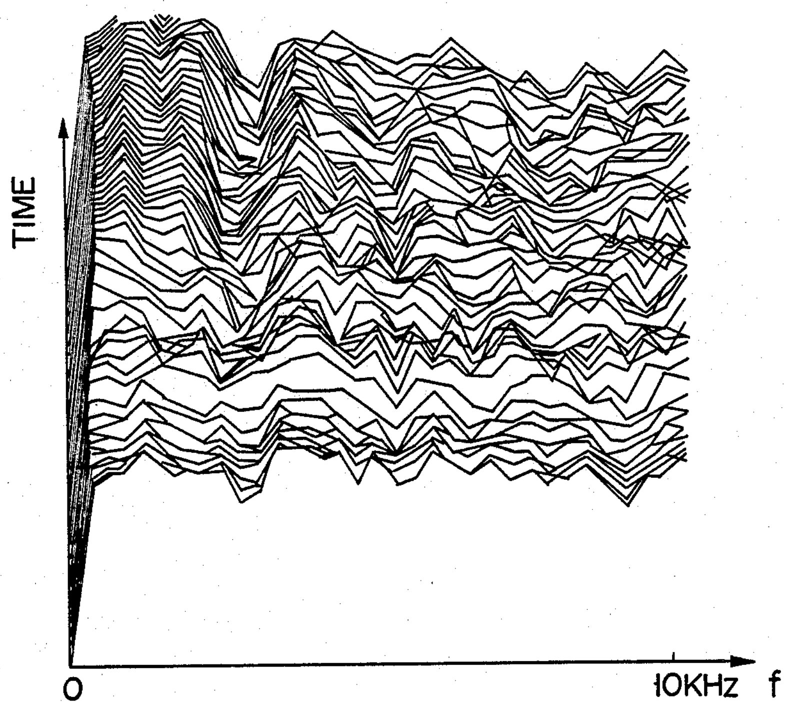
FIG. 13A is a graph showing a spectrum envelope of a female utterance of "ta"
Figure 13B:
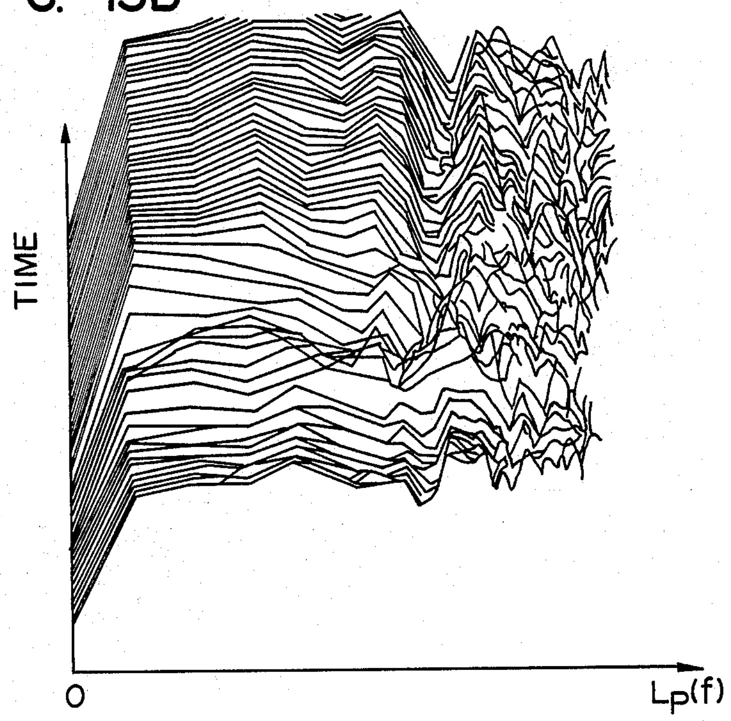
FIG. 13B is a graph showing the results of transform U of male and female utterances of Japanese phoneme "a" in units of mels.

FIG. 13A shows time serial changes of logarithmic spectrum envelope log|P(f)| obtained by shifting the frame position as a function of time with respect to the leading portion of Japanese phoneme "ta" uttered by a female. FIG. 13B shows time serial changes of speech analysis results by transforming (U) logarithmic spectrum envelope log|P(f)| shown in FIG. 13A. According to the measurement results, it is apparent that transform U is stably effected for a consonant and the leading edge of a vowel and is displayed.

Figure 14A:
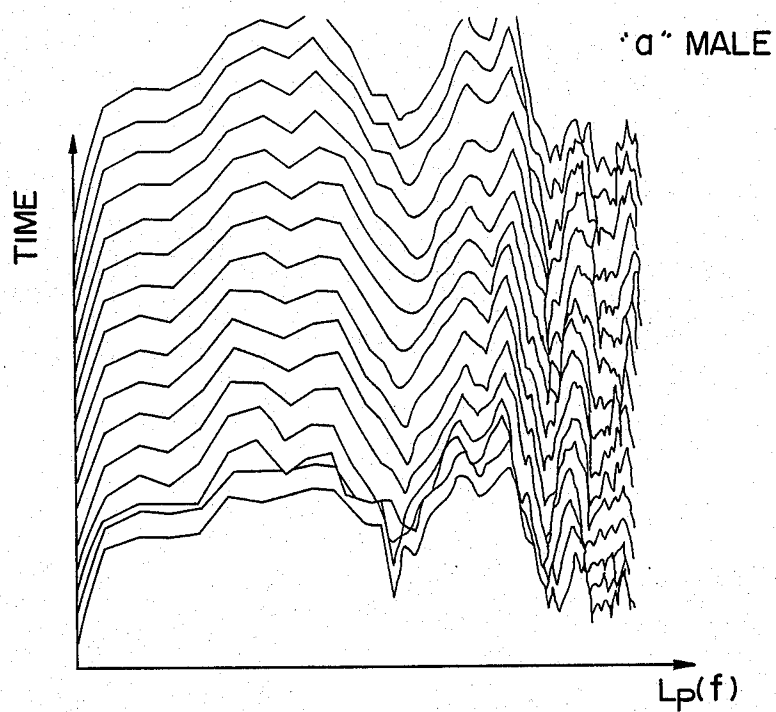
FIGS. 14A and 14B are graphs showing results of transform U of male and female utterances of phoneme "a" in units of mels.
Figure 14B:
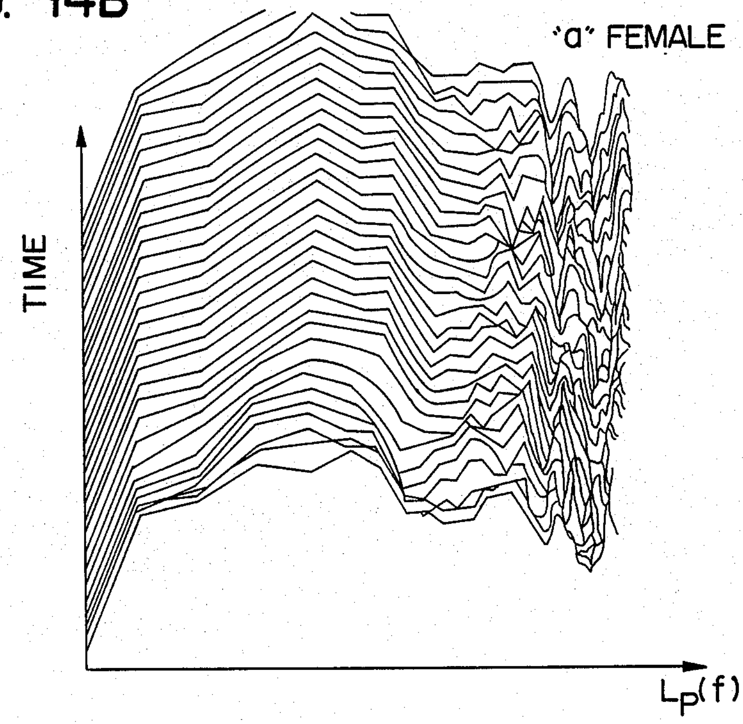

FIGS. 14A and 14B show time serial changes of male and female utterances of Japanese phoneme "a" obtained in the same manner as in FIG. 13B. When the vowel portions in FIGS. 14A and 14B and FIG. 13B are compared, the influence of a large difference between the male and female vocal tract lengths has been eliminated.

According to this embodiment as described in detail, envelope data (P(f), P(f), $\overline{\log|P(f)|}$ or $\overline{\log|P(f)|}$) is projected with respect to frequency f onto LP(f) by transform U defined by equation (15) or (17), thereby obtaining the speech analysis results.

With this arrangement, differences in analysis results caused by different vocal tract lengths l of the speakers can be eliminated. The analysis results inherent to the phonemes can be always obtained. In this case, this embodiment is applicable to the spectrum envelope of any portion of input speech signal AIN regardless of voiced and unvoiced sounds, and vowels and consonants. Furthermore, since the analysis results do not depend on extraction precision and stability of formant frequency F, the method is applicable to the entire range of input speech signal AIN. In this embodiment, particularly, changes in spectrum envelope in the transition from a consonant to a vowel can be determined without being influenced by different individual vocal tract lengths l, unlike in the conventional speech analysis method.

In this embodiment, since normalized logarithmic spectrum envelope $\overline{\log|P(f)|}$ is used in place of spectrum envelope P(f) or logarithmic spectrum envelope $\log|P(f)|$ as the integral function represented by equation (15), the influence of voice magnitudes for an identical phoneme can be eliminated.

The present invention is not limited to the particular embodiment described above.

For example, in order to obtain a function to be integrated, given by equation (15), in the above embodiment, spectrum envelope P(f) output from extractor 11 is converted into a logarithm and the logarithm is normalized. However, normalization may come first and logarithm conversion may come next.

The speech analysis apparatus of the present invention may be constituted by hardware or software.

Various changes and modifications may be made without departing the spirit and scope of the invention.

In the above embodiments, spectrum envelope extractor 11 comprises a conventional extactor but may be arranged as follows.

Another arrangement of spectrum envelope extractor 11 will be described in detail with reference to FIG. 2A.

FIG. 2A is a block diagram showing another embodiment of spectrum envelope extractor 11. Before describing extractor 11 with reference to FIG. 2A, its principle will be described with reference to FIGS. 15A to 19C.

Now assume a signal (FIG. 15A) as a model for generating speech signal i(t). In this model, a train of repetition pulses p(t) (FIG. 15B) having pitch period T is amplitude-modulated with intensity envelope e(t) of the vocal cord vibrations. A signal from such a sound source is filtered with dynamic vocal tract characteristics $q(t;\tau)$ as a function of time, thereby obtaining signal i(t).

The above model is mathematically expressed as follows:

$$i(t)=\int d\tau q(t;\tau)e(\tau)p(\tau) \quad (21)$$

If stationary vocal tract characteristics as a function of time is exemplified as a special case, $$q(t;\tau)\rightarrow q(t-\tau)$$

Equation (21) entails equation (22) below in the same manner as in the conventional cepstrum analysis model:

$$i(t)=\int d\tau q(t-\tau)e(\tau)p(\tau) \quad (22)$$

In the model as a fundamental model of this embodiment, the vocal tract characteristics of the conventional cepstrum analysis model (equation (22)) are considered to change as a function of time.

If Fourier-transformed results of dynamic vocal tract characteristics $q(t;\tau)$, vocal cord vibration waveform (pulse train) p(t), and sound source envelope intensity e(t) are given as $Q(t,\Omega)$, $P(2\pi m/T)$, and E(k), their relationships are given as follows:

$$q(t;\tau)=(\tfrac{1}{2}\pi)\int d\Omega e^{i\Omega(t-\tau)}Q(t,\Omega) \quad (23)$$

$$p(\tau) = (\tfrac{1}{2}\pi) \sum_m e^{i}(2\pi m\tau)/T_p(2\pi m/T) \quad (24)$$

$$e(\tau)=(\tfrac{1}{2}\pi)\int dk e^{ik\pi}E(k) \quad (25)$$

wherein $p(\tau)$ is a pulse signal having a predetermined period and serves as a Fourier series.

A mathematical expression of stationary model equation (22) for $q(t-\tau)$ is as follows:

$$q(t-\tau)=(\tfrac{1}{2}\pi)\int d\Omega e^{i\Omega(t-\tau)}Q(\Omega) \quad (26)$$

The equation (23) indicates a natural expansion for equation (26), in the dynamic model, and $Q(t,\Omega)$ represents temporal changes in angular frequency $\Omega$ component of the spectrum of the vocal tract characteristics.

Substitution of equations (23) to (25) into equation (21) as a speech generation model yields the following equation:

$$i(t) = \int \left[ (d\omega/2\pi)e^{i\omega t}Q(t,\omega) \times (\tfrac{1}{2}\pi) \sum_m E(\omega - 2\pi m/T) \times P(2\pi m/T) \right. \quad (27)$$

Term $(\tfrac{1}{2}\pi) \sum_m E(\omega - 2\pi m/T)P(2\pi m/T)$ is assumed as follows: (28)

$$F(\omega) = (\tfrac{1}{2}\pi) \sum_m E(\omega - 2\pi m/T)P(2\pi m/T)$$

Substitution of $F(\Omega)$ into equation (27) yields equation (29) below:

$$i(t)=\int (d\Omega/2\pi)e^{i\Omega t}Q(t,\Omega)F(\Omega) \quad (29)$$

A Fourier transform is performed for the dependency of $Q(t,\Omega)$ on t to derive equation (30):

$$Q'(P,\Omega)=\int dt e^{-itp}Q(t,\Omega) \quad (30)$$

Fourier spectrum $I(\Omega)$ of speech signal i(t) is expressed by equations (29) and (30) as follows:

$$\begin{aligned} I(\omega) &= \int dt e^{-i\omega t}i(t) \\ &= \int (dp/2\pi)F(\omega - p)Q'(p,\omega - p) \end{aligned} \quad (31)$$

Figure 16:
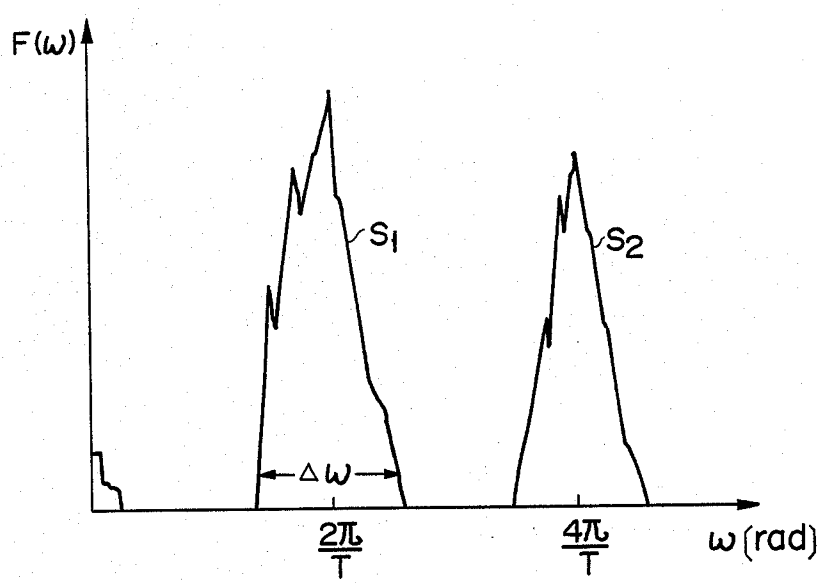
FIG. 16 is a graph showing the result of Fourier transform of a pulse train of FIG. 15A.

Function $F(\Omega)$ defined by equation (28) is a dispersive spectrum having a period of $2\pi/T$ in FIG. 16. Width $\Delta\Omega$ of the spectrum in FIG. 16 is a bandwidth of spectrum $E(\Omega)$ of envelope intensity e(t). Bandwidth $\Delta\Omega$ is defined by abrupt changes in envelope intensity e(t) as a function of time. More specifically, if the spectrum envelope is abruptly changed, bandwidth $\Delta\Omega$ of $F(\Omega)$ is increased. However, in practice, since the spectrum envelope of the speech signal is not so abruptly changed, $F(\Omega)$ has a significant value near $2m\pi/T$. It should be noted that envelope intensity e(t) must satisfy conditions wherein intensity e(t) is not abruptly changed within the one-pitch time of the vocal cord vibration for separation of two spectra Sl and S2 of FIG. 16. Similarly, the dependency of $Q'(P,\Omega)$ on P, defined by equation (30), represents a vocal tract spectrum as a function of time. If it is assumed that envelope intensity e(t) is not abruptly changed within the one-pitch time of the vocal cord vibration, then E(P) is limited to the following bandwidth:

$$|P|<2\pi/T$$

Figure 17:
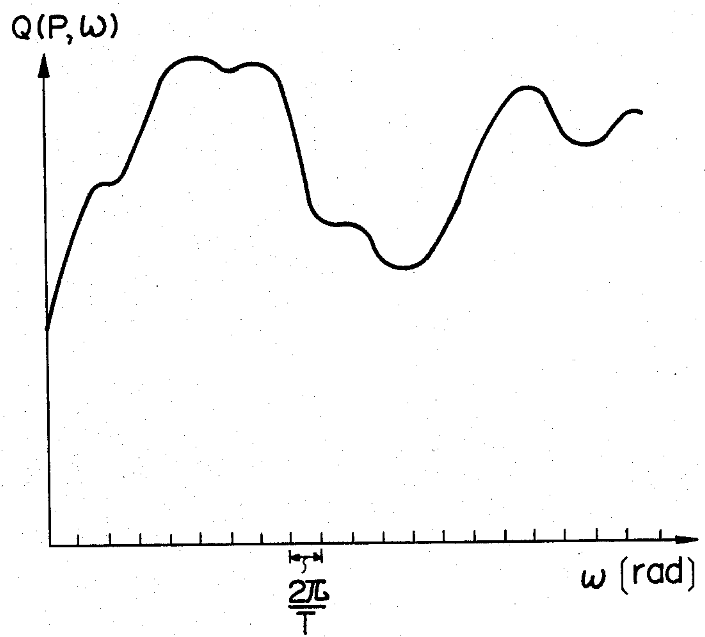
FIG. 17 is a graph showing the result of Fourier transform of the, vocal tract characteristics in FIG. 15C.

The dependency of $Q'(P,\Omega)$ on $\Omega$ represents the vocal tract spectrum. As shown in FIG. 17, it is not abruptly changed within the period of $2\pi/T$ corresponding to one pitch.

As a result of the above discussion, $Q'(P,\Omega-P)$ in the integral of equation (31) has a value excluding 0 if $|P|<2\Omega/T$. In this case, the following approximation can be obtained:

$$Q'(P,\Omega-P)\approx Q'(P,\Omega) \quad (32)$$

If $Q'(P,\Omega)$ is represented as $Q'(P,2\pi m/T)$ since $\Omega$ is near $2\pi m/T$, then $$|\Omega-2\pi m/T|<2\pi/T \quad (33)$$

In a range indicated by equation (33), $I(\Omega)$ in equation (31) is approximated by the next $\overline{I^m}(\Omega)$:

$$\overline{I^m}(\Omega)=\int(dp/2\pi)F(\Omega-P)\overline{Q}'(P,2\pi m/T) \quad (34)$$

$F(\Omega-P)$ in equation (34) is given by equation (28) as follows:

$$F(\omega-P)=(1/2\pi)\sum_m E(\omega-P-2\pi/T)P(2\pi m/T)$$

Therefore, $$\overline{I^m}(\omega)=(1/2\pi)\sum_n P(2\pi n/T)\times \int(dp/2\pi)E(\omega-P-2\pi n/T)\times\overline{Q}'(P1,2\pi m/T) \quad (35)$$

By definitions of equations (24) and (30), $$E(\Omega-P-2\pi n/T)=\int d\tau e^{-i\tau(\Omega-P-2\pi m/T)}e(\tau) \quad (36)$$

$$Q'(P,2\pi m/T)=\int dte^{-itp}\overline{Q}(t,2\pi m/T) \quad (37)$$

Substitution of equations (36) and (37) into equation (35) yields the following equation:

$$I^m(\omega)=\sum_n P(2\pi n/T)\times\int(d\tau/2\pi)e^{-i\tau(\omega-2\pi n/T)}\times e(\tau)\overline{Q}(\tau,2\pi m/T) \quad (38)$$

Under the above assumption, since spectra of $e(\tau)$ and $\overline{Q}(\tau),2\pi m/T)$ are limited within $|2\pi/T|$, the integral of the right-hand side of equation (38) has a value excluding zero only if:

$$|\Omega-2\pi n/T|<2\pi/T \quad (39)$$

Since $\Omega$ in equation (38) is assumed to be near $2\pi m/T$ by the assumption of equation (33), that is, $$|\Omega-2\pi m/T|<2\pi/T \quad (33)$$

the sum related to n of equation (38) results in only the $n=m$ term according to inequalities (33) and (39). That is, $$\overline{I^m}=P(2\pi m/T)\times\int(d\tau/2\pi)e^{-i\tau(\Omega-2\pi m/T)}\times e(\tau)\overline{Q}(\tau 2\pi m/T) \quad (40)$$

Function $e(\tau)\overline{Q}(\tau,2\pi m/T)$ in the integral of equation (40) is derived based on the assumption of bandwidth limitation within $|2\pi/T|$, that is, the assumption of a discrete spectrum. Therefore, the integral related to $\tau$ of equation (40) can be approximated by the sum of sampling intervals T:

$$\begin{aligned} I^m(\omega) &\approx P(2\pi m/T)\times\sum_n e^{-inT(\omega-2\pi m/T)}\times e(nT)\overline{Q}(nT,2\pi m/T) \\ &= \sum_n e^{-inT\omega}\{P(2\pi m/T)e(nT)\overline{Q}(nT,2\pi m/T)\} \end{aligned} \quad (41)$$

Although $\overline{I^m}(\Omega)$ is defined as a value near $\Omega\approx 2\pi m/T$ of $I(\Omega)$, this function can be expanded as a cyclic function in other frequency ranges:

$$\overline{I^m}(\Omega)=\overline{I^m}(\Omega-2\pi l/T)$$

for $l=\pm1, \pm2, \ldots$

Figure 18A:
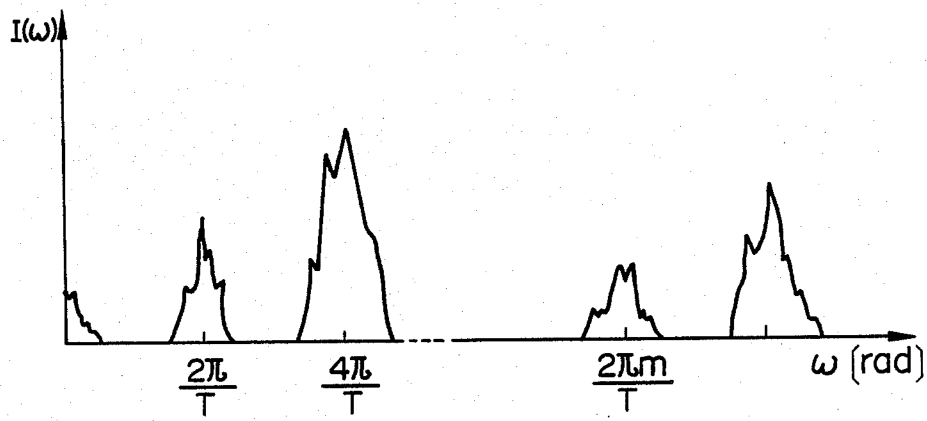
FIGS. 18A and 18B are graphs showing discrete spectra.
Figure 18B:
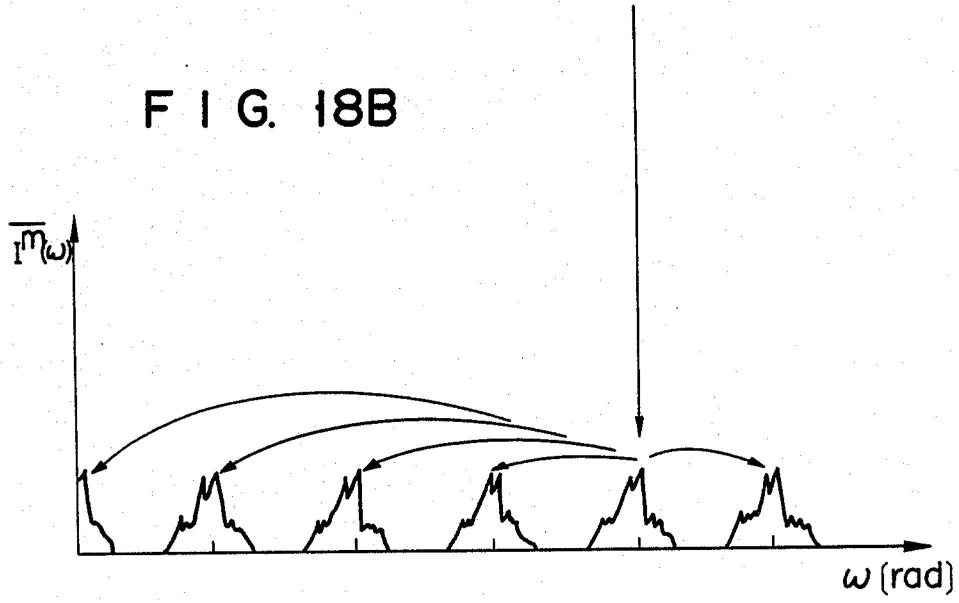

The above function is plotted, as shown in FIGS. 18A and 18B.

Cyclic function $\overline{I^m}(\Omega)$ is expressed by Fourier expansion as follows:

$$\overline{I^m}(\omega)=\sum_n e^{-\overline{inT\omega im}(nT)} \quad (42)$$

The introduced $\overline{i^n}(nT)$ is derived by inverse Fourier transform as follows:

$$\overline{i^m}(nT)=\int_{2\pi m/T-\pi/T}^{2\pi m/T+\pi/T} d\omega e^{i\omega nT}\overline{I^m}(\omega) \quad (43)$$

The resultant functions by equations (41) and (42) are compared to factorize them as follows:

$$\overline{i^m}(nT)=P(2\pi m/T)e(nT)\overline{Q}(nT,2\pi m/T) \quad (44)$$

Equation (44) is the final expression.

The left-hand side of equation (44) is defined by equation (43) as follows:

$$\overline{i^m}(nT)=\int_{2\pi m/T-\pi/T}^{2\pi m/T+\pi/T} d\omega e^{i\omega nT}\overline{I^m}(\omega) \quad (43)$$

However, relation $$\overline{I^m}(\Omega)\approx I(\Omega) \quad (44)$$

is established within the integration range $$|\Omega-2\pi m/T|<2\pi/T$$

Therefore, relation (44) is substituted by equation (45) below:

$$\overline{i^m}(nT)\approx\int_{2\pi m/T-\omega/T}^{2\pi m/T+\pi/T} d\omega e^{i\omega nT}I(\omega) \quad (45)$$

In fine, if both vocal tract characteristics $q(t;\tau)$ as a function of time and envelope intensity $e(t)$ of the amplitude of the vocal cord sound source are not abruptly changed within the pitch period of T, i.e., if their spectra are limited within the bandwidth of $|2\pi/T|$, the following results are obtained upon reception of input speech signal $i(t)$:

$$I(\omega) = \int dt e^{i\omega t} i(t) \quad (46)$$

$$\overline{i^m}(nT) = \int_{2\pi m/T - \pi/T}^{2\pi m/T + \pi/T} d\omega e^{i\omega nT} I(\omega)$$

$$P(2\pi m/T) e(nT) \overline{Q}(nT, 2\pi m/T) = \overline{i^m}(nT)$$

Figure 19A:
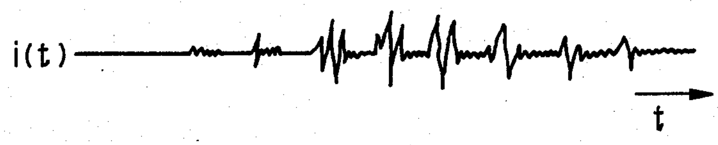
FIGS. 19A to 19C are views illustrating a time frequency pattern of a frequency spectrum derived from the speech signal.
Figure 19B:
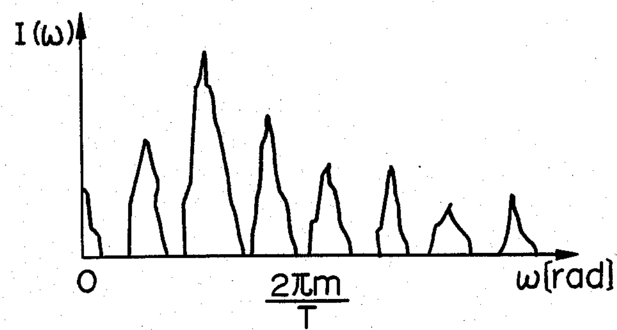
Figure 19C:
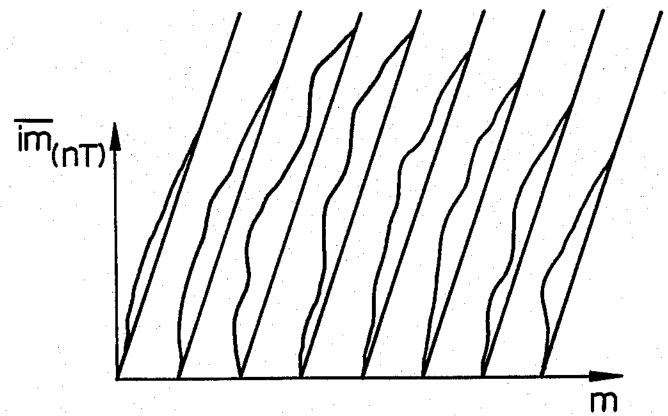

The procedures are illustrated in FIGS. 19A to 19C. Equation (44) indicates that $\overline{i^m}$(nT) at time nT is a product of the vocal cord vibration spectrum, the sound source intensity, and the vocal tract characteristic spectrum at this time. The resultant $\overline{i^m}$(nT) is time frequency pattern SEP(t;fP·n) of the frequency spectrum of input speech signal i(t), wherein t=nT and fP=1/T.

The principle of operation has been described above, and the arrangement therefor will be described referring back to FIGS. 2A and 2B.

Referring to FIG. 2A, Fourier transform circuit 111 performs Fourier transform of input speech signal i(t) to obtain its frequency spectrum.

Pitch frequency detector 112 detects pitch frequency fP of signal i(t). Detector 112 performs, e.g., cepstrum analysis of the output from circuit 111 to detect pitch frequency fP.

Spectrum extractor 113 extracts a spectrum of predetermined frequency range fA from the frequency spectrum output from Fourier transform circuit 111. Predetermined frequency range fA is set on the basis of pitch frequency fP detected by detector 112 in the following manner:

$$fP \times n - fP/2 < fA < fP \times n + fP/2$$

where n is 0 or a positive integer.

Inverse Fourier transform circuit 114 performs inverse Fourier transform of the frequency spectrum extracted by extractor 113 to obtain time frequency pattern SEP(t;fP·n) of the frequency spectrum at frequency fP×n.

The speech analysis apparatus having functional blocks in FIG. 2A can be realized by either hardware or software. The software arrangement of the apparatus will be described with reference to the detailed arrangement of FIGS. 2A and 2B.

Figure 21:
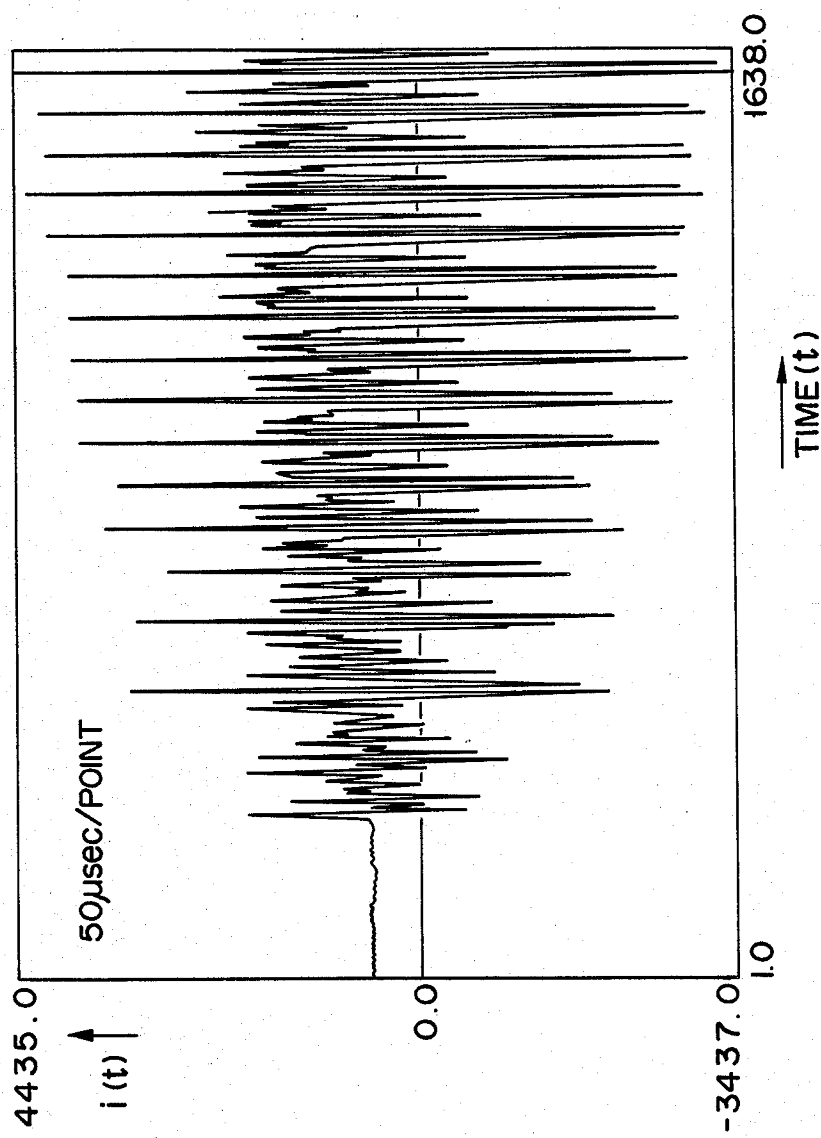
FIG. 21 is a graph showing the input speech signal.

FIG. 21 shows a speech input sample obtained such that a speech signal input at a microphone is sampled at a sampling frequency of 50 μsec, and the sampled values are quantized by a 12-bit analog/digital converter. The data in FIG. 21 represents samples of 1638 points out of the entire speech samples. In this case, the speaker is a female in her twenties, and the phoneme is Japanese vowel "a". The frame in FIG. 21 also includes a leading portion of the vowel.

FIG. 20 is a flowchart showing speech sample processing. Referring to FIG. 20, in step S1, a speech sample having a predetermined frame length is extracted from the quantized speech sample. If the speech sample in the frame is given as in (1<n<N), a difference is calculated as preprocessing in step S2 as follows:

$$i_n \leftarrow i_n - i_{n-1}$$

Figure 22:
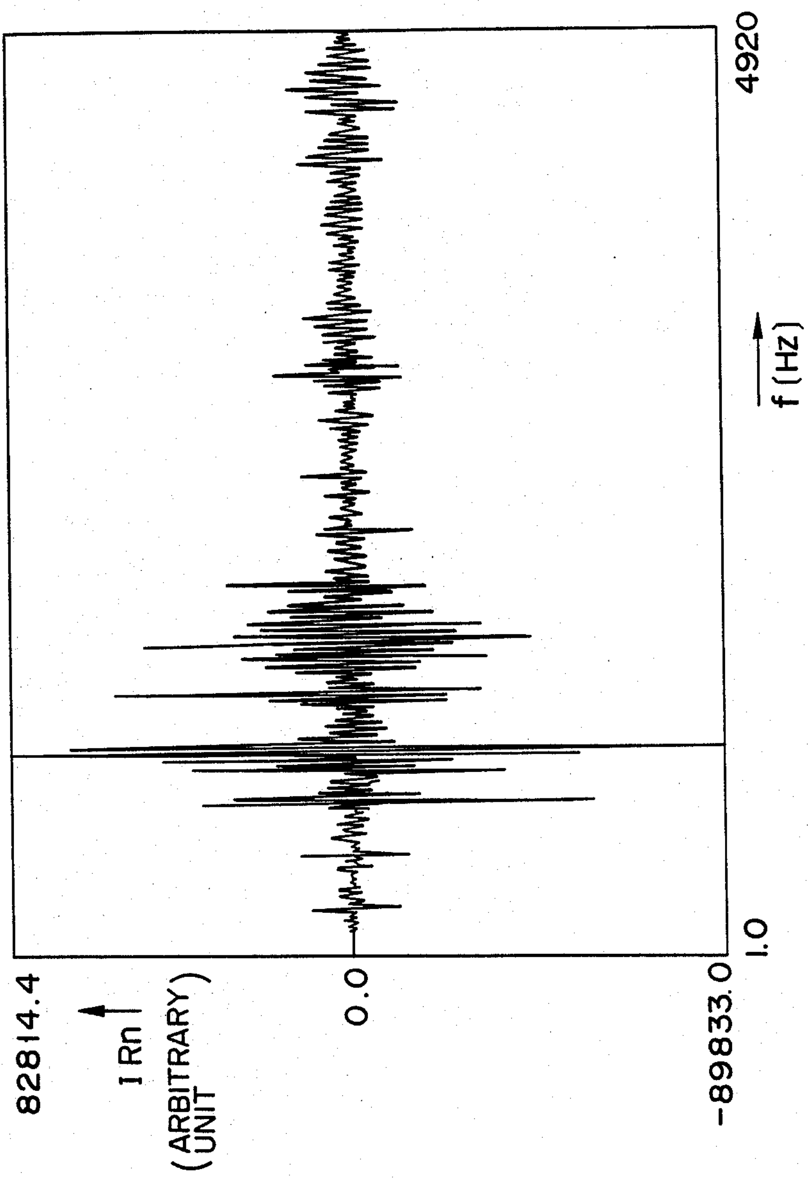
FIGS. 22 and 23 are graphs showing real and imaginary parts of resultant spectrum I(Ω)
Figure 23:
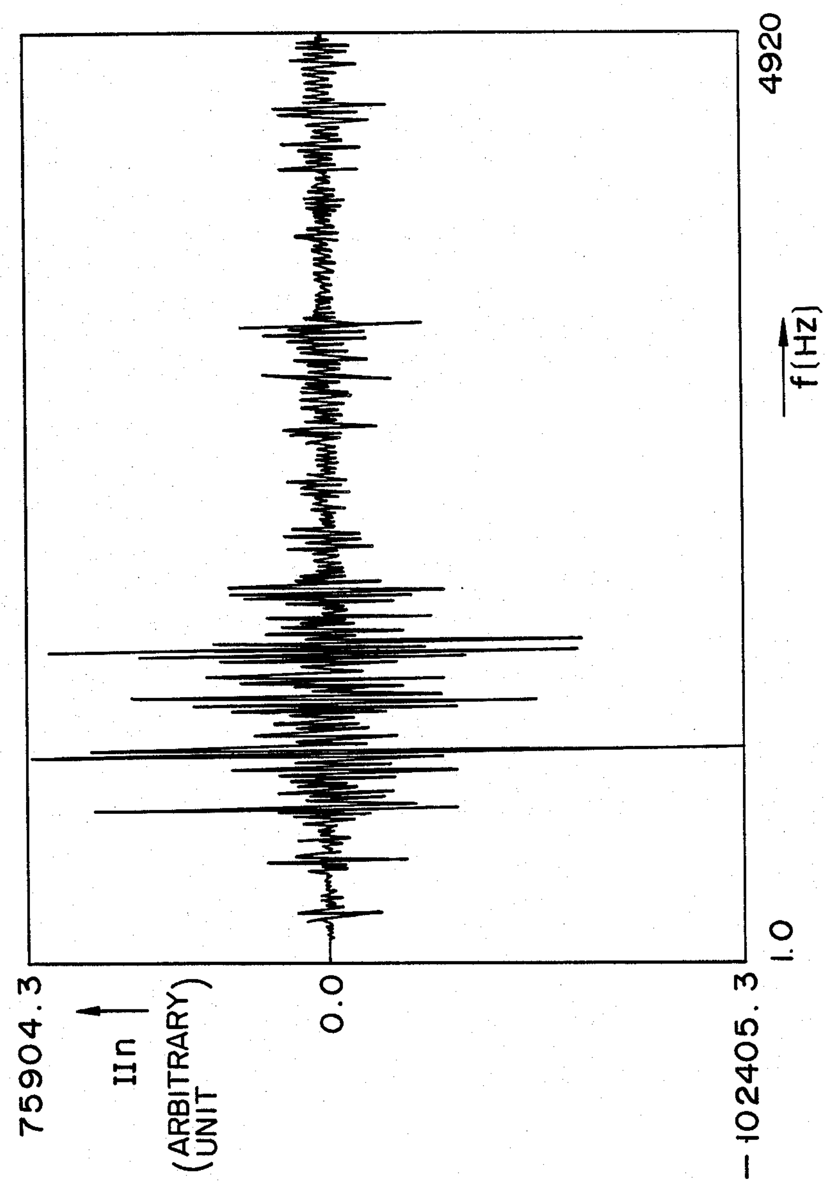

The Hamming window is multiplied with the difference output in step S3:

$$i_n \leftarrow i_n \times (0.56 + 0.44 \times \cos 2\pi n/N)$$

and fast Fourier transform (FFT) is performed in step S4. Frequency spectrum I(Ω) is calculated on the basis of the transform result in step S5. If the real and imaginary parts of spectrum I(Ω) obtained in response to the speech signal in FIG. 21 are defined as IRn and IIn, these components are as illustrated in FIGS. 22 and 23, respectively. In this case, n is defined as 1<n<N/2.

The above operations correspond to processing of Fourier transform circuit 111 in FIG. 2A. In steps S6 and S7, processing of pitch frequency detector 112 is performed. More specifically, in step S6, cepstrum analysis of the Fourier transform output is performed. In step S7, pitch period T, i.e., pitch frequency fP, of the input speech signal is detected on the basis of the analysis result.

In step S8 to S10, processing of spectrum extractor 113 and inverse Fourier transform circuit 114 of FIG. 2A is performed. More specifically, a one-period component is extracted from frequency spectrum I(Ω) and is subjected to inverse Fourier transform, thereby repetitively calculating time frequency pattern SEP(t;fP·n) of spectrum I(Ω). In step S8, M/2 data signals before and after (n×M)th data components of spectra IRn and IIn are shifted into the following two regions each having length L longer than pitch period T:

$$IMRj, IMIj \ (1 \leq j \leq L).$$

Figure 24A:
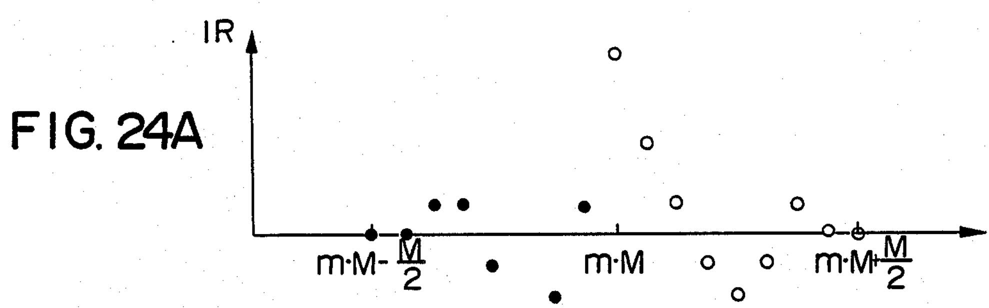
FIGS. 24A to 24D are graphs showing data rearrangement according to an FFT algorithm.
Figure 24B:
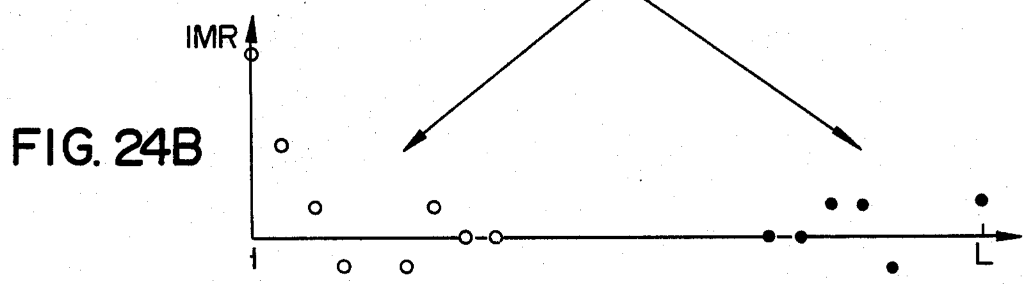
Figure 24C:
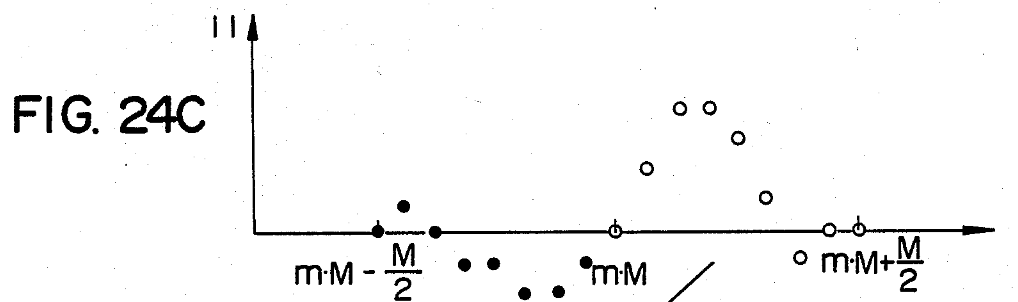
Figure 24D:
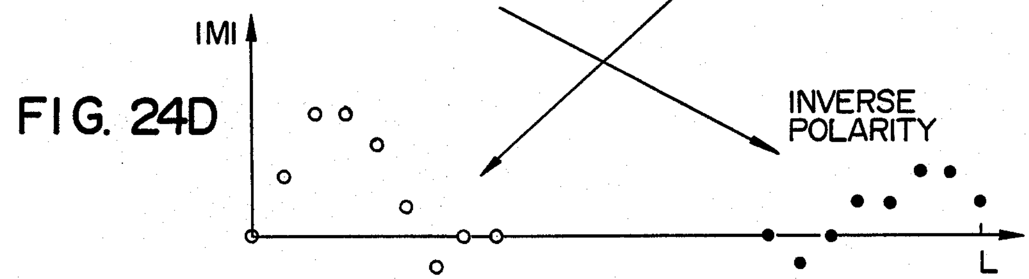

The data shifting rules are given in FIGS. 24A to 24D so as to correspond to the FFT algorithm. More specifically, the data components of the real part of the Fourier-transformed spectrum are rearranged following the rule shown in FIGS. 24A and 24B. The data components of the imaginary part of the Fourier-transformed spectrum are rearranged, as shown in FIGS. 24C and 24D. The positive sign of a part of the data components indicated in FIG. 24C is changed to the negative sign, or vice versa. Thereafter, in step S9, inverse Fourier transform is performed for each pair of IMR and IMI to obtain time frequency pattern $\overline{i^m}$(nT) of the spectrum. This operation is repeated for m from 1 to N/2M.

DC component $\overline{i^o}$(nT) of the spectrum corresponds to the case of m=0. Since the difference of the speech samples is calculated is step S2, $\overline{i^o}$(nT) is regarded as 0 and thus neglected.

FIG. 25 shows the logarithms of absolute values of time frequency pattern SEP(mT:fP·n) of the resultant spectrum.

The embodiment described in detail above provides the following effect. In conventional cepstrum analysis and conventional AR model speech analysis, only the average spectrum of the analysis frame is extracted from the input speech signal. However, in this embodiment, the time frequency pattern of the spectrum in the analysis frame can be extracted. Therefore, abrupt changes in spectrum can be stably extracted with high precision.

Furthermore, time frequency pattern SEP(t;fPn) of the resultant spectrum has a definite meaning given by equation (44). Since artificial parameters (e.g., orders of analysis in the AR model, and the cutoff frequency in cepstrum analysis) are not included in the analysis results, high reliability is guaranteed.

FIG. 2B shows still another embodiment of the present invention. The same reference numerals as in FIG. 2A denote the same parts in FIG. 2B, and a detailed description thereof will be omitted.

In the arrangement of FIG. 2B, an output from inverse Fourier transform circuit 114 is supplied to absolute value circuit 115. Absolute value circuit 115 calculates an absolute value of the input signal and supplies the value to smoothing circuit 116. Smoothing circuit 116 calculates an average propagation value of the input signal along the time base to smooth the input signal and generates a smoothed signal.

The above arrangement provides the following effect. The time frequency pattern derived from the frame including the unvoiced and consonant portions include many noise components. If this time frequency pattern is used, time frequency pattern SEP(t;fPn) shown in FIG. 27 is obtained. In this case, it is hard to say that this pattern represents a significant spectrum envelope. However, as described above, time frequency pattern SEP(mT;fP·n) of the spectrum obtained by inverse Fourier transform circuit 114 is smoothed to reduce the influence of the noise, thus obtaining a high-quality time frequency pattern output shown in FIG. 26.

Figure 26:
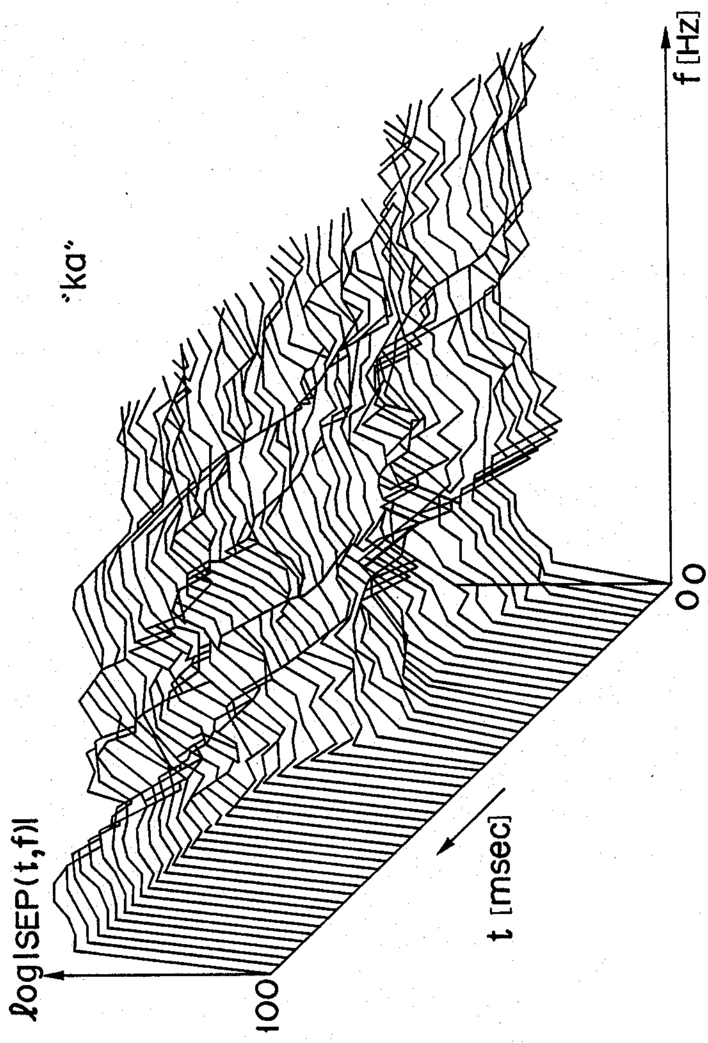
FIGS. 26 and 27 are graphs showing time frequency patterns of a frequency spectra obtained by the embodiment of FIGS. 2B and 2A.
Figure 27:
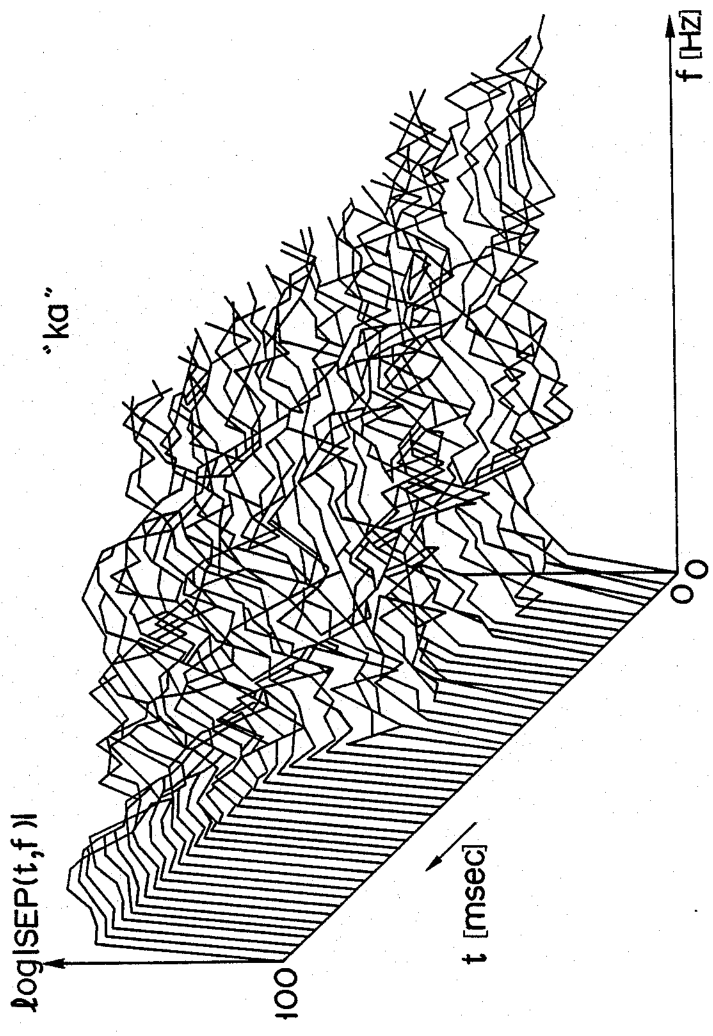

FIGS. 26 and 27 show the cases wherein the leading portion of Japanese phoneme "ka" is used to obtain time frequency patterns with and without smoothing. If these graphs are compared with each other, the pattern with smoothing in FIG. 26 has a smaller influence than that without smoothing in FIG. 27. In the pattern of FIG. 26, an average value of three points is simply calculated to obtain the moving average value:

$$\begin{aligned}|SEP(mT,fP\cdot n)| \leftarrow & (|SEP((m-1)T,fP\cdot n)| \\ & + |SEP(mT,fP\cdot n)| \\ & + |SEP(m+1)T,fP\cdot n)|)/3\end{aligned}$$

A speech analysis apparatus according to still another embodiment of the present invention will be described in detail with reference to FIGS. 29 to 32.

The arrangement of this embodiment will be first described with reference to FIG. 29. The speech analysis apparatus comprises spectrum envelope extractor 11', logarithm circuit 12', normalizing circuit 13', integrator 14', and synthesizer 15' in the same manner as in the previous embodiments. And, transform section 10' comprises logarithm circuit 12' and normalizing circuit 13'. Synthesizer 15' is operated in the same manner as projection circuit 15 of the previous embodiments. The speech analysis apparatus of FIG. 29 further includes CPU 16' and display unit 17'.

Figure 31:
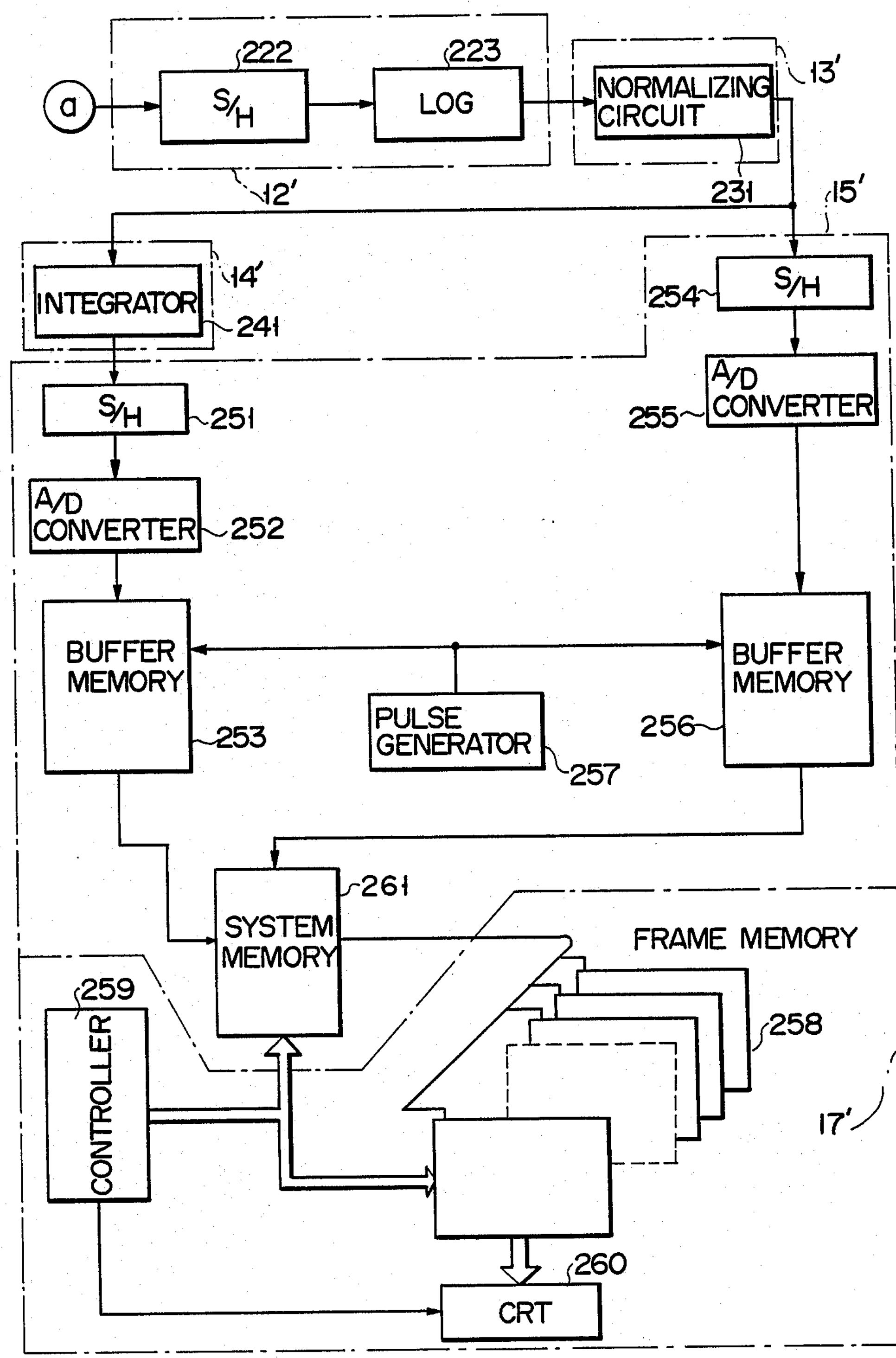

The arrangements of the respective components will be described in detail with reference to FIGS. 30 and 31.

Spectrum envelope extractor 11' comprises adjuster 211 for adjusting the level of the input speech signal, high-band enhancement circuit 212 for emphasizing the high-frequency component of the input speech signal, buffer 213 for strengthening the signal suitably for the next stage, distributor circuit 214 for dividing the signal from buffer 213 into components having suitable frequency bands and strengthing and outputting these components, filter bank 215 for extracting the signal components from distributor circuit 214 in units of predetermined frequency bands to shape a spectrum envelope according to band control data from the CPU 16', and multiplexer circuit 216 for receiving spectrum envelope data from filter bank 215 and outputting serial data thereof according to output selection control data from CPU 16'.

In this embodiment, distributor circuit 214 comprises four distributors 214-1 to 214-4. Filter bank 215 comprises eight filters 215-1 to 215-8. Each filter comprises band-pass filter 315, rectifier 316, and low-pass filter 317. Band- and low-pass filters 315 and 317 are DT-212D and DT-6FLl available from NF Circuit Design Block Co. Ltd. respectively.

Band-pass filter 315 is controlled in response to control data from CPU 16' and passes a signal having a specific frequency band therethrough. Rectifier 316 full-wave rectifies the signal output from filter 315, and the full-wave rectified output is supplied to low-pass filter 317. Filter 317 extracts a low-frequency component of the signals from rectifier 316, i.e., a component causing variations. Therefore, the bandwidth is limited by band-pass filter 315, and the band-limited spectrum envelope is obtained.

Logarithm circuit 12' sequentially receives spectrum envelopes converted into serial data output from spectrum envelope extractor 11'. Logarithm circuit 12' comprises sample/hold circuit (S/H) 222 for sampling and holding the spectrum envelope data of each channel and logarithm circuit (LOG) 223 for receiving the signal held by S/H 222 and converting it into a logarithm signal.

The output of logarithm circuit 12' is connected to normalizing circuit 231 and is normalized thereby. An output of normalizing circuit 231 is supplied to integrator 241 of integrator 14' and synthesizer 15'.

Synthesizer 15' comprises sample/hold circuit (S/H) 251 for sampling and holding data integrated by integrator 14', A/D converter 252 for converting data held by S/H 251 into digital data, buffer memory 253 for temporarily storing data output from A/D converter 252 in response to clock pulses from pulse generator 257, sample/hold circuit (S/H) 254 for sampling and holding the spectrum envelope output from normalizing circuit 13, A/D converter 255 for converting data held by S/H 251 into digital data, buffer memory 256 for temporarily storing data output from A/D converter 252 in response to clock pulses from generator 257, and system memory 261 for storing data stored in memory 256 in accordance with data stored in buffer memory 253 as address data.

With the above arrangement, the input speech signal can be detected. In order to display the detection result, the apparatus of this embodiment further includes display unit 17' connected to the output of synthesizer 15'.

Display unit 17' comprises display controller 259 for reading out data from system memory 261, frame memory 258 for storing data read out from memory 261 so as to display it, and CRT 260 for displaying data stored in memory 258 in response to an instruction from controller 259.

Frame memory 258 comprises eight frame memories. Data read out from memory 261 is classified into eight data signals and is stored in a proper frame memory according to this classification result. Each data thus corresponds to one point of one of the frame memories, thereby displaying the gradation of the resultant spectrum envelope.

The operation of the speech signal analysis apparatus having the arrangement described above will be described below.

BCD code control data from CPU 16' is supplied to band- and low-pass filters 315 and 317 prior to input of the speech signal. In this embodiment, 64 band-pass filters are prepared. 64 portions of the frequency band of the spectrum envelope, i.e., 64 channels are selected. Therefore, if the control data supplied from CPU 16' is defined along the logarithm frequency axis, the last spectrum envelope can be used for comparison along the frequency axis. Alternatively, if control data is defined along the mel axis, it can be used for comparison along the mel axis.

After band- and low-pass filters 315 and 317 are set in response to control data from CPU 16', the speech signal is input to adjuster 211. The input speech signal is adjusted to have a proper DC level. The adjusted signal is input to high-band enhancement circuit 212. Since the speech signal is attenuated as the frequency becomes high, the high-frequency component of the speech signal is enhanced so as to have the about same level as that of the low-frequency component. The enhanced signal is output to buffer 213.

In this embodiment, the spectrum envelope to be analyzed is divided into 64 channels, i.e., frequency bands and is detected. For this reason, the speech signal must pass through a large number (64 in this embodiment) of filters and is strengthened by buffer 213. The signal output from buffer 213 is supplied to distributor circuit 214 and strengthened and divided into four frequency bands. The signal output from distributor 214-1 is supplied to filters FB0A215-1 and FB0B215-2. Other signals are supplied to the corresponding filters as described above.

Figure 32:
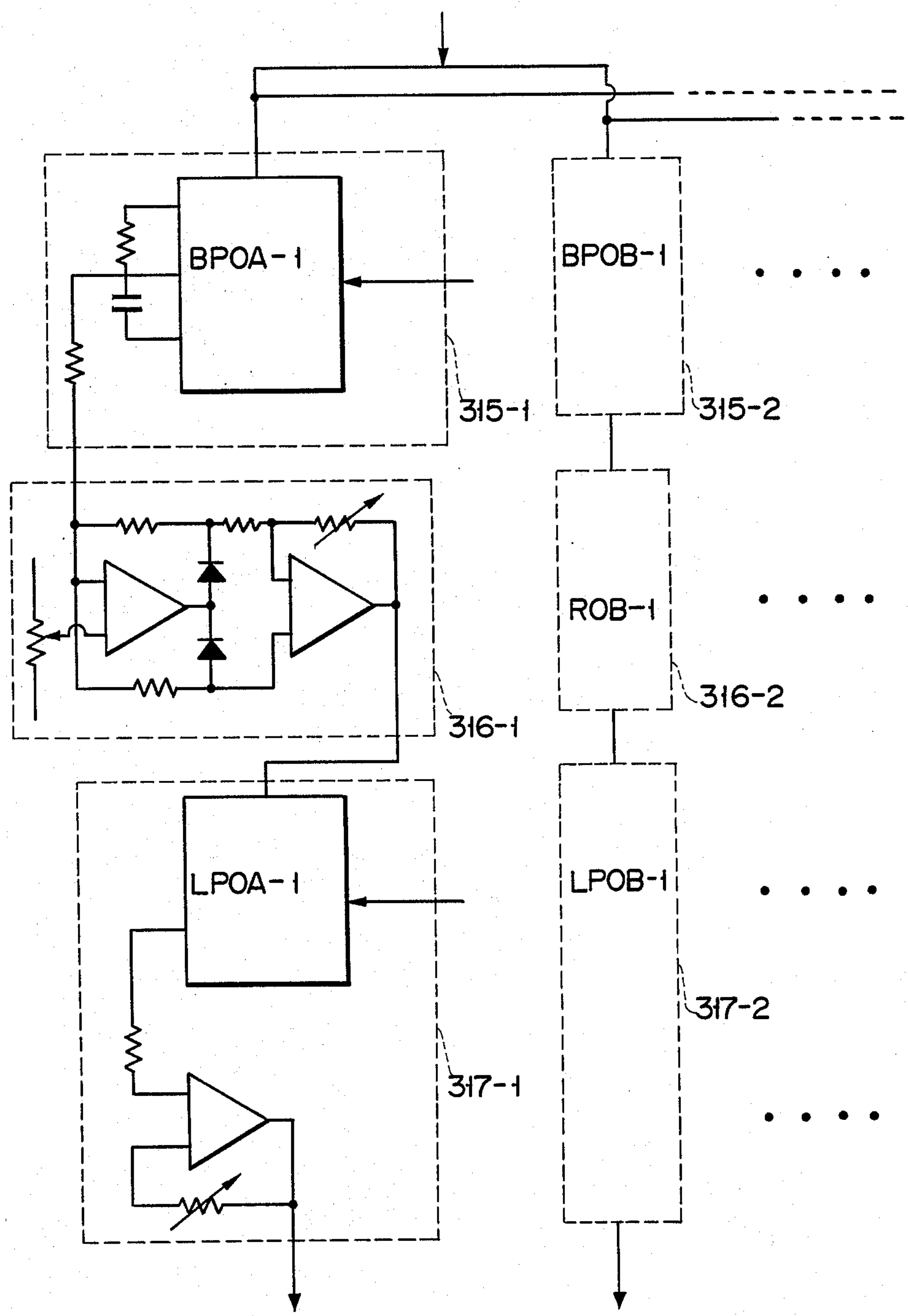
FIG. 32 is a block diagram of a filter bank of FIG. 30.

Each filter 215 includes 8 channels. Each channel comprises band-pass filter 315, rectifier 316, and low-pass filter 317, as shown in FIG. 32. Filter 315-1 receives external BCD control data and outputs a predetermined frequency component of the input signal in response to the BCD control data. The full-wave rectified signal by rectifier 316-1 is supplied to low-pass filter 317-1.

The band of low-pass filter 317-1 is limited by the external BCD data and filter 317-1 extracts a predetermined frequency component of the signal output from rectifier 316-1. Therefore, the band is limited by band-pass filter 315 and the band-limited spectrum envelope is obtained.

Outputs from low-pass filters 317-1 to 317-16 are supplied to multiplexer 216-1. Similarly, outputs from filters 317-17 to 317-32 are supplied to multiplexer 216-2; and another output from low-pass filters in filter bank 251-3 to 251-8 are supplied to multiplexer 216-2 to 216-4, similarly.

In this embodiment, 64-channel band is specified to obtain 64 spectrum envelopes. Multiplexers 216-1 to 216-4 sequentially output data of the respective channels in response to selections control data supplied from CPU 16'.

The signal from multiplexer circuit 216 is converted into a logarithm signal. In this case, the signal output from multiplexer 216-1 includes noise in its initial portion. The selection control data is output from CPU 16' such that the signal is sampled and held by S/H 222 after the signal is stabilized. The signal held by S/H 222 is converted into a logarithm signal by LOG 223.

The logarithm spectrum envelope signal is output to integrator 241 and synthesizer 15'. Integrator 241 integrates the input spectrum envelope, and the integrated result is output to S/H 251 of synthesizer 15'.

S/Hs 251 and 254 in synthesizer 15' sample and hold the input spectrum envelope in response to a signal output from multiplexer 216, and the held signals are output to A/D converters 252 and 255. A/D converters 252 and 255 convert input analog signals into digital data, and the digital signals from converters 252 and 255 are supplied to buffer memories 253 and 256, respectively.

Memories 253 and 256 receive clocks from pulse generator 257. Generator 257 receives a signal (from CPU 16') synchronized with the selection control data supplied to multiplexer 216 and supplies clocks as address data to memories 253 and 256 in response to the signal from CPU 16'. Therefore, memory 253 temporarily receives the integrated value, and the logarithm of the spectrum envelope is temporarily stored at an address (this address is the same as that of memory 253) of memory 256.

in memory 256 is stored in system memory 216 under the control of controller 259. In this case, data stored in buffer memory 253 serves as address data of memory 261, and data stored in memory 256 is stored in system memory 261. Since the data stored in memory 253 is integrated data, it is not always stored at every predetermined addresses of memory 261. If the extracted spectrum envelope is abruptly changed, the address of the memory 261 is jumped to a higher address.

If the intensity data of the spectrum envelope are stored at addresses in memory 261 which are separated more than a predetermined value, interpolation data may be supplied from CPU 16' to memory 261.

Data stored in system memory 261 is read out by controller 259 and is supplied to frame memory 258. In this case, the readout data is discriminated as to which one of the levels corresponds to the level of the read-out data. The readout data is supplied according to the discrimination result. Data stored in frame memory 258 is displayed on CRT 260. In this case, the data is classified into eight levels, so that the gradation of the data can be displayed. For example, a portion corresponding to the peak of the time frequency pattern of the spectrum envelope is displayed in white, and other portions are displayed in black.

As described in detail, the control data from CPU 16' is properly selected and the selected speech signal is supplied to the filter bank. Therefore, the data can be integrated on the frequency or mel axis.

What is claimed is:

1. A speech analysis apparatus capable of obtaining an analysis result inherent to a phoneme, regardless of vocal tract lengths, comprising:

transforming means for receiving a spectrum envelope representing intensity data of a spectrum corresponding to a speech signal, and for proportionally transforming the received spectrum envelope such that maximum intensity data of the spectrum envelope is substantially equal to a predetermined intensity data;

integrating means for integrating the transformed spectrum envelope from said transforming means with respect to a predetermined variable from a first value of the variable to a second value of the variable obtain integral data at the second value; and projecting means for projecting the transformed spectrum envelope with respect to the integrated data by varying the second value from the first value to a third value of the variable, and for obtaining a relationship between intensity data of the transformed spectrum envelope at the second value and the integral data at the second value.

2. The apparatus according to claim 1, wherein said transforming means comprises:

logarithm means for taking a logarithm of the intensity data of the received spectrum envelope to obtain a logarithmic spectrum envelope; and normalizing means for normalizing the logarithmic spectrum envelope according to the predetermined intensity data to obtain the transformed spectrum envelope.

3. The apparatus according to claim 1, wherein said transforming means comprises:

normalizing means for normalizing the received spectrum envelope according to the predetermined intensity data; and logarithm means for taking a logarithm of the intensity data of the normalized spectrum envelope, such that the maximum intensity data of the normalized spectrum envelope is substantially equal to the predetermined intensity data to obtain the transformed spectrum envelope.

4. The apparatus according to claim 1, wherein said transforming means comprises means for taking a logarithm of the received spectrum envelope such that the maximum intensity data of the spectrum envelope is substantially equal to the predetermined intensity data, to obtain the transformed spectrum envelope.

5. The apparatus according to claim 1, wherein said transforming means comprises means for equalizing the spectrum envelope, such that a total power of the received envelope is substantially equal to a predetermined power, to obtain the transformed spectrum envelope.

6. The apparatus according to claim 1, wherein said variable is frequency.

7. The apparatus according to claim 6, wherein the first value is a value ranging from 10 to 100 Hz.

8. The apparatus according to claim 1, wherein said variable is mels.

9. The apparatus according to claim 1, wherein the variable is a logarithmic frequency.

10. The apparatus according to claim 9, wherein the first value is a logarithmic value ranging from 10 to 100 Hz.

11. The apparatus according to claim 8, wherein the first value is zero.

12. The apparatus according to claim 1, further comprising spectrum envelope extracting means for extracting the spectrum envelope from an input speech signal, and for outputting the spectrum envelope to said transforming means.

13. The apparatus according to claim 12, wherein said spectrum envelope extracting means comprises:

Fourier transforming means for Fourier transforming the speech signal to obtain power spectra;

pitch frequency detecting means for detecting a pitch frequency of the speech signal from the power spectra;

spectrum extracting means for extracting from the power spectra each partial power spectrum within a frequency range defined as:

$$fP \times n - fP/2 < fA < fP \times n + fP/2,$$

where fp is the detected pitch frequency and n is 0 or a positive integer; and inverse Fourier transforming means for performing inverse Fourier transformation of each partial power spectrum extracted by said spectrum extracted means.

14. The apparatus according to claim 13, wherein said pitch frequency detecting means includes cepstrum analysis means for performing cepstrum analysis of the power spectra from said Fourier transforming means, to detect the pitch frequency.

15. The apparatus according to claim 13, wherein said spectrum envelope extracting means further comprises smoothing means for smoothing the spectrum envelope from said inverse Fourier transforming means.

16. The apparatus according to claim 12, wherein said spectrum envelope extracting means comprises:

high band enhancing means for enhancing the speech signal, such that a level of a high-frequency component of the speech signal is substantially equal to that of a low-frequency component of the speech signal;

a plurality of extracting means each for passing a portion of the high band enhanced speech signal within a bandwidth limited in accordance with input first control data, for full-wave rectifying the passed portion of the enhanced speech signal, and for extracting a low frequency component of the passed portion in accordance with the first control data;

a plurality of low-pass filter means respectively coupled to said plurality of rectifying means, for detecting a temporal change in peak value of the full-wave rectified part from said plurality of rectifying means, in accordance with the first multiplexing means for sequentially outputting the low frequency components from said plurality of extracting means in accordance with input second control data to obtain the spectrum envelope; and control means for outputting the first control data to said plurality of extracting means and the second control data to said multiplexing means in response to an input speech analysis instruction.

17. The apparatus according to claim 16, wherein said control means includes means for outputting the first control data to said plurality of extracting means such that the spectrum envelope with respect to frequency is obtained.

18. The apparatus according to claim 16, wherein said control means includes means for outputting the first control data to said plurality of extracting means such that the spectrum envelope with respect to mels is obtained.

19. The apparatus according to claim 16, wherein said control means further comprises means for generating third control data in response to the speech analysis instruction; and said relation obtaining means comprises;

first A/D converting means converting the integral data from said integrating means, into digital integral data;

second A/D converting means for converting the intensity data of the transformed spectrum envelope from said transforming means, into digital intensity data; and storage means for storing the digital intensity data in accordance with the digital integral data.

20. The apparatus according to claim 19, further comprising display means for displaying the digital intensity data stored in said storage means, with respect to the digital integral data.

21. A method of obtaining an analysis result inherent to a phoneme, regardless of vocal tract lengths comprising:

receiving a spectrum envelope to proportionally transform the spectrum envelope such that maximum intensity data of the received spectrum envelope is substantially equal to predetermined intensity data;

integrating the transformed spectrum envelope with respect to a predetermined variable from a first value of the variable to a second value of the variable to obtain data at the second value;

varying the second value from the first value to a third value of the variable to obtain a relationship between intensity data of the transformed spectrum envelope at the second value and the integral data at the second value.

22. The method according to claim 21, wherein said transforming of the spectrum envelope comprises taking a logarithm of the received spectrum envelope.

23. The method according to claim 21, wherein the variable is either frequency or mels.

24. The method according to claim 21, further comprising extracting the spectrum envelope from an input speech signal.

25. The method according to claim 24, wherein said extracting of the spectrum envelope comprises:

Fourier-transforming the speech signal to obtain power spectra;

detecting a pitch frequency of the speech signal from the obtained power spectra;

extracting from the power spectra each partial power spectrum within a frequency range defined as:

$$fP \times n - fP/2 < fA < fP \times n + fP/2$$

where fP is the detected pitch frequency and n is 0 or a positive integer; and performing inverse Fourier transformation of each partial power spectrum to obtain the spectrum envelope.

26. The method according to claim 25, wherein said detecting of the pitch frequency includes performing cepstrum analysis of the power spectra.

27. The method according to claim 25, wherein said extracting of the spectrum envelope further comprises smoothing the spectrum envelope.

28. An apparatus capable of extracting a spectrum envelope from an input speech signal, comprising:

Fourier transforming means for Fourier transforming the speech signal to obtain a power spectra;

pitch frequency detecting means for detecting a pitch frequency of the speech signal from the obtained power spectra;

spectrum extracting means for extracting from the obtained power spectra each partial power spectrum within a frequency range defined as:

$$fP \times n - fP/2 < fA < fP \times n + fP/2$$

where fP is the detected pitch frequency and n is 0 or a positive integer; and inverse Fourier transforming means for performing inverse Fourier transformation of each partial power spectrum to obtain the spectrum envelope.

29. The apparatus according to claim 28, wherein said pitch frequency detecting means includes cepstrum analysis means for performing cepstrum analysis of the power spectra transformed by said Fourier transforming means, to detect the pitch frequency.

30. The apparatus according to claim 29, wherein said spectrum envelope extracting means further comprises smoothing means for smoothing the spectrum envelope from said inverse Fourier transforming means.

* * * * *

UNITED STATES PATENT AND TRADEMARK OFFICE

CERTIFICATE OF CORRECTION

PATENT NO. : 4,827,516

DATED : May 2, 1989

INVENTOR(S) : Yusuke Tsukahara, Hitoshi Masuda, Mikio Yamaguchi and Masao Tanabe.

It is certified that error appears in the above-identified patent and that said Letters Patent is hereby corrected as shown below:

On the title page:

Add:

Foreign Application Priority Data

Sept. 26, 1986 [JP] Japan.................................. 61-227286

Signed and Sealed this

Twenty-seventh Day of March, 1990

*Attest:*

JEFFREY M. SAMUELS

*Attesting Officer*

*Acting Commissioner of Patents and Trademarks*